US010975945B2

(12) United States Patent
Downs et al.

(10) Patent No.: US 10,975,945 B2
(45) Date of Patent: Apr. 13, 2021

(54) AXLE ASSEMBLY

(71) Applicants: James P. Downs, South Lyon, MI (US); Paul J. Valente, Berkley, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 878 days.

(21) Appl. No.: 15/213,602

(22) Filed: Jul. 19, 2016

(65) Prior Publication Data

US 2016/0327143 A1 Nov. 10, 2016

Related U.S. Application Data

(63) Continuation of application No. 15/151,831, filed on May 11, 2016, now Pat. No. 9,593,757, which is a (Continued)

(51) Int. Cl.
*F16H 48/08* (2006.01)
*F16H 48/22* (2006.01)
(Continued)

(52) U.S. Cl.
CPC .............. *F16H 48/22* (2013.01); *B60B 35/16* (2013.01); *B60K 17/165* (2013.01);
(Continued)

(58) Field of Classification Search
CPC .......... F16H 48/08; F16H 48/38; F16H 48/40; F16H 48/42; F16H 2048/385;
(Continued)

(56) References Cited

U.S. PATENT DOCUMENTS

| 696,704 A | 4/1902 | Allen |
| 783,168 A | 2/1905 | Baker |

(Continued)

FOREIGN PATENT DOCUMENTS

| CN | 201334012 Y | 10/2009 |
| DE | 01627594 A1 | 8/1970 |

(Continued)

OTHER PUBLICATIONS

Communication pursuant to Rule 62 EPC dated May 2, 2018.
(Continued)

*Primary Examiner* — Huan Le
(74) *Attorney, Agent, or Firm* — Burris Law, PLLC

(57) ABSTRACT

An axle assembly with a carrier housing, an input pinion and a ring gear. The input pinion includes pinion gear teeth and is supported for rotation about a first axis relative to the carrier housing via first and second bearings that are disposed along the first axis on opposite sides of the pinion gear teeth. The ring gear includes ring gear teeth that are meshed to the pinion gear teeth and a third bearing supports the ring gear for rotation about the second axis relative to the carrier housing. The third bearing is disposed along the second axis on a side of the ring gear that is opposite the first axis.

26 Claims, 20 Drawing Sheets

Related U.S. Application Data continuation of application No. 14/629,614, filed on Feb. 24, 2015, now Pat. No. 9,677,656, which is a continuation of application No. 14/244,117, filed on Apr. 3, 2014, now Pat. No. 9,103,427, which is a continuation of application No. 14/205,535, filed on Mar. 12, 2014, now Pat. No. 9,157,515.

(60) Provisional application No. 61/787,547, filed on Mar. 15, 2013.

(51) Int. Cl.
| | | |
|---|---|---|
| F16H 48/38 | (2012.01) | |
| F16C 33/58 | (2006.01) | |
| F16H 48/42 | (2012.01) | |
| F16H 57/021 | (2012.01) | |
| F16H 57/037 | (2012.01) | |
| F16H 48/40 | (2012.01) | |
| F16C 19/54 | (2006.01) | |
| F16H 57/031 | (2012.01) | |
| B60B 35/16 | (2006.01) | |
| B60K 17/16 | (2006.01) | |

(52) U.S. Cl.
CPC .......... *F16C 19/546* (2013.01); *F16C 33/581* (2013.01); *F16H 48/08* (2013.01); *F16H 48/38* (2013.01); *F16H 48/40* (2013.01); *F16H 48/42* (2013.01); *F16H 57/021* (2013.01); *F16H 57/031* (2013.01); *F16H 57/037* (2013.01); *F16C 2361/31* (2013.01); *F16C 2361/61* (2013.01); *F16H 2048/385* (2013.01); *F16H 2048/405* (2013.01); *F16H 2048/423* (2013.01); *F16H 2048/426* (2013.01)

(58) Field of Classification Search
CPC .......... F16H 2048/405; F16H 2048/423; F16H 2048/426; F16H 57/021; F16H 57/037; B60B 35/16
See application file for complete search history.

(56) References Cited

U.S. PATENT DOCUMENTS

| | | | |
|---|---|---|---|
| 899,891 A | 9/1908 | Niclausse | |
| 1,128,429 A | 2/1915 | Fetzer | |
| 1,657,510 A * | 1/1928 | Leipert | F16H 48/08 475/222 |
| 1,987,716 A | 1/1935 | Skelton | |
| 2,609,710 A | 9/1952 | Osborn | |
| 3,344,687 A * | 10/1967 | Stockton | B60K 17/16 475/251 |
| 3,385,133 A | 5/1968 | Terao | |
| 3,394,610 A | 7/1968 | Szodfridt | |
| 3,741,030 A | 6/1973 | Asberg | |
| 3,777,360 A | 12/1973 | Welch | |
| 3,792,625 A | 2/1974 | Asberg | |
| 3,905,457 A | 9/1975 | Shea | |
| 3,915,267 A | 10/1975 | Shea | |
| 4,004,472 A | 1/1977 | Millward et al. | |
| 4,182,201 A | 1/1980 | Mayhew et al. | |
| 4,227,427 A * | 10/1980 | Dick | F16C 19/548 184/6.12 |
| 4,588,313 A | 5/1986 | Knappe et al. | |
| 4,952,195 A | 8/1990 | Traylor | |
| 5,098,355 A | 3/1992 | Long | |
| 5,203,750 A | 4/1993 | Oster et al. | |
| 5,503,494 A | 4/1996 | Kamata et al. | |
| 5,560,687 A | 10/1996 | Hagelthorn | |
| 5,865,701 A | 2/1999 | Sowa et al. | |
| 5,913,745 A | 6/1999 | Inagaki et al. | |
| 6,056,663 A | 5/2000 | Fett | |
| 6,077,183 A | 6/2000 | Tar et al. | |
| 6,254,196 B1 | 7/2001 | Gee | |
| 6,283,884 B1 | 9/2001 | El-Kassouf | |
| 6,540,634 B2 | 4/2003 | Thompson | |
| 6,544,140 B2 | 4/2003 | Gradu et al. | |
| 6,582,334 B1 | 6/2003 | Noll | |
| 6,616,565 B1 | 9/2003 | Chen et al. | |
| 6,623,396 B2 | 9/2003 | Szalony et al. | |
| 6,645,113 B2 | 11/2003 | Orr et al. | |
| 6,652,408 B2 | 11/2003 | Rutt et al. | |
| 6,695,739 B2 | 2/2004 | Fett | |
| 6,699,154 B2 | 3/2004 | Orr et al. | |
| 6,702,707 B2 | 3/2004 | Krzesicki et al. | |
| 6,719,661 B2 | 4/2004 | Turner et al. | |
| 6,824,489 B2 | 11/2004 | Jacob et al. | |
| 6,863,634 B2 | 3/2005 | Holman et al. | |
| 6,863,684 B2 | 3/2005 | Kim et al. | |
| 6,896,463 B2 | 5/2005 | Tuthill | |
| 7,022,041 B2 | 4/2006 | Valente | |
| 7,086,983 B2 | 8/2006 | Turner et al. | |
| 7,155,824 B2 | 1/2007 | Prucher | |
| 7,188,699 B2 | 3/2007 | Moore et al. | |
| 7,232,399 B2 | 6/2007 | Valente | |
| 7,314,416 B2 | 1/2008 | Loughrin et al. | |
| 7,393,301 B2 | 7/2008 | Green, Jr. | |
| 7,500,934 B2 | 3/2009 | Ziech | |
| 7,520,833 B2 | 4/2009 | Honda et al. | |
| 7,775,928 B2 | 8/2010 | Zink | |
| 7,901,318 B2 | 3/2011 | Downs et al. | |
| 7,984,782 B2 | 7/2011 | Platt et al. | |
| 8,167,758 B2 | 5/2012 | Downs et al. | |
| 8,616,780 B2 | 12/2013 | Kwasniewski et al. | |
| 8,951,159 B2 | 2/2015 | Fox et al. | |
| 2003/0070501 A1 | 4/2003 | Bell | |
| 2003/0166432 A1 | 9/2003 | Patzer et al. | |
| 2003/0186774 A1 | 10/2003 | Sullivan | |
| 2003/0236147 A1 | 12/2003 | Fett | |
| 2005/0101430 A1 | 5/2005 | Ziech | |
| 2005/0245342 A1 | 11/2005 | Pontanari et al. | |
| 2008/0287244 A1 | 11/2008 | Liu | |
| 2008/0305910 A1 | 12/2008 | Brasile et al. | |
| 2008/0318725 A1 | 12/2008 | Waksmundzki | |
| 2009/0163313 A1 | 6/2009 | Gassmann et al. | |
| 2009/0263064 A1 * | 10/2009 | Baer | F16C 19/184 384/512 |
| 2010/0062891 A1 | 3/2010 | Ekonen et al. | |
| 2010/0151982 A1 | 6/2010 | Waksmundzki | |
| 2011/0123264 A1 | 5/2011 | Wang | |
| 2013/0303323 A1 | 11/2013 | Zink et al. | |
| 2014/0274544 A1 | 9/2014 | Downs et al. | |
| 2015/0033909 A1 | 2/2015 | Campbell | |
| 2015/0057897 A1 | 2/2015 | Stoiber et al. | |

FOREIGN PATENT DOCUMENTS

| | | |
|---|---|---|
| DE | 1555366 A1 | 10/1970 |
| DE | 07106774 U | 5/1971 |
| DE | 02132412 A1 | 1/1972 |
| DE | 03132443 A1 | 2/1983 |
| DE | 19713211 A1 | 12/1997 |
| DE | 10209166 A1 | 9/2003 |
| DE | 10312348 A1 | 10/2004 |
| DE | 102008039476 | 2/2010 |
| DE | 102012206143 A1 | 10/2013 |
| EP | 1348589 A2 | 10/2003 |
| GB | 191106765 A | 3/1912 |
| GB | 00881308 A | 11/1961 |
| JP | 60884472 | 10/1983 |
| JP | 06117518 | 4/1994 |
| JP | 2001010304 A | 1/2001 |
| JP | 2011063224 A | 3/2011 |
| WO | WO-2010123964 A1 | 10/2010 |
| WO | WO-14151287 A1 | 9/2014 |

OTHER PUBLICATIONS

An Office Action dated May 8, 2019 from Indian Patent Application No. 5975CHENP2015 filed Oct. 1, 2015.

(56) References Cited

OTHER PUBLICATIONS

Office Action issued to Brazil counterpart application No. 1120150169104 dated Mar. 27, 2020.
Office Action issued to German counterpart application No. 102015112356.8 dated Jul. 29, 2020.
Office Action dated Sep. 26, 2014 for U.S. Appl. No. 14/205,535.
Decker_KH_Maschinenelemente.
Sajaz_Radlager—Version Jul. 10, 2012.
Effect of Mn on hardenability of 25CrMo axle steel by an improved end-quench test.

* cited by examiner

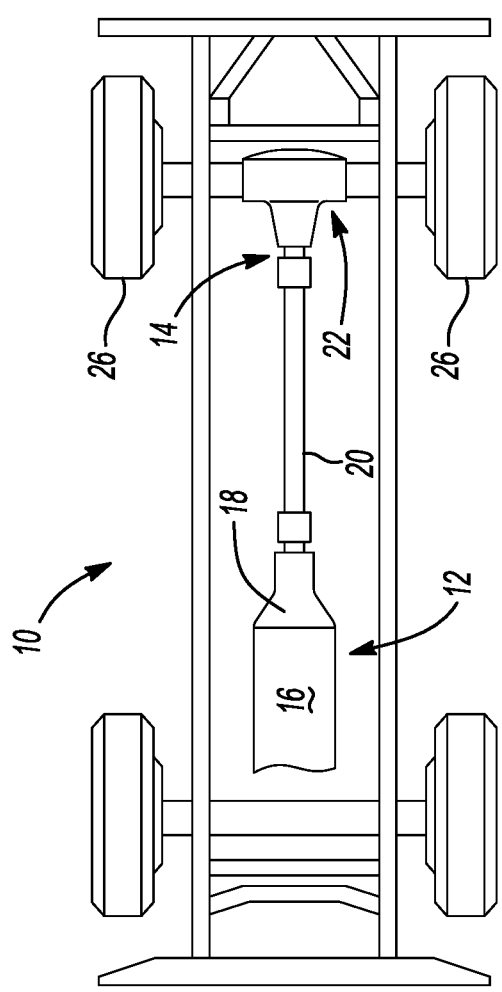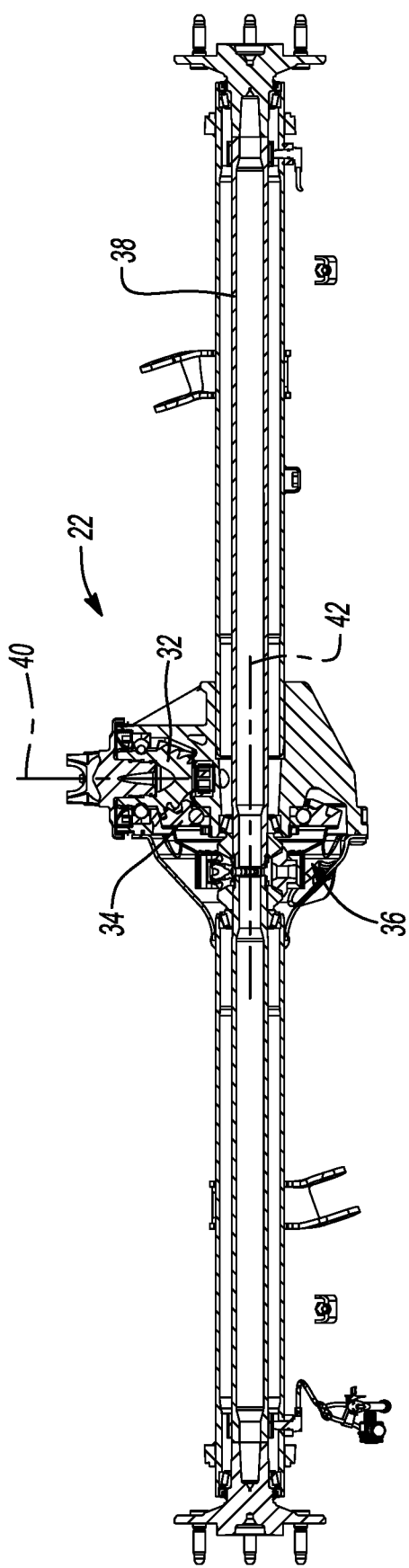

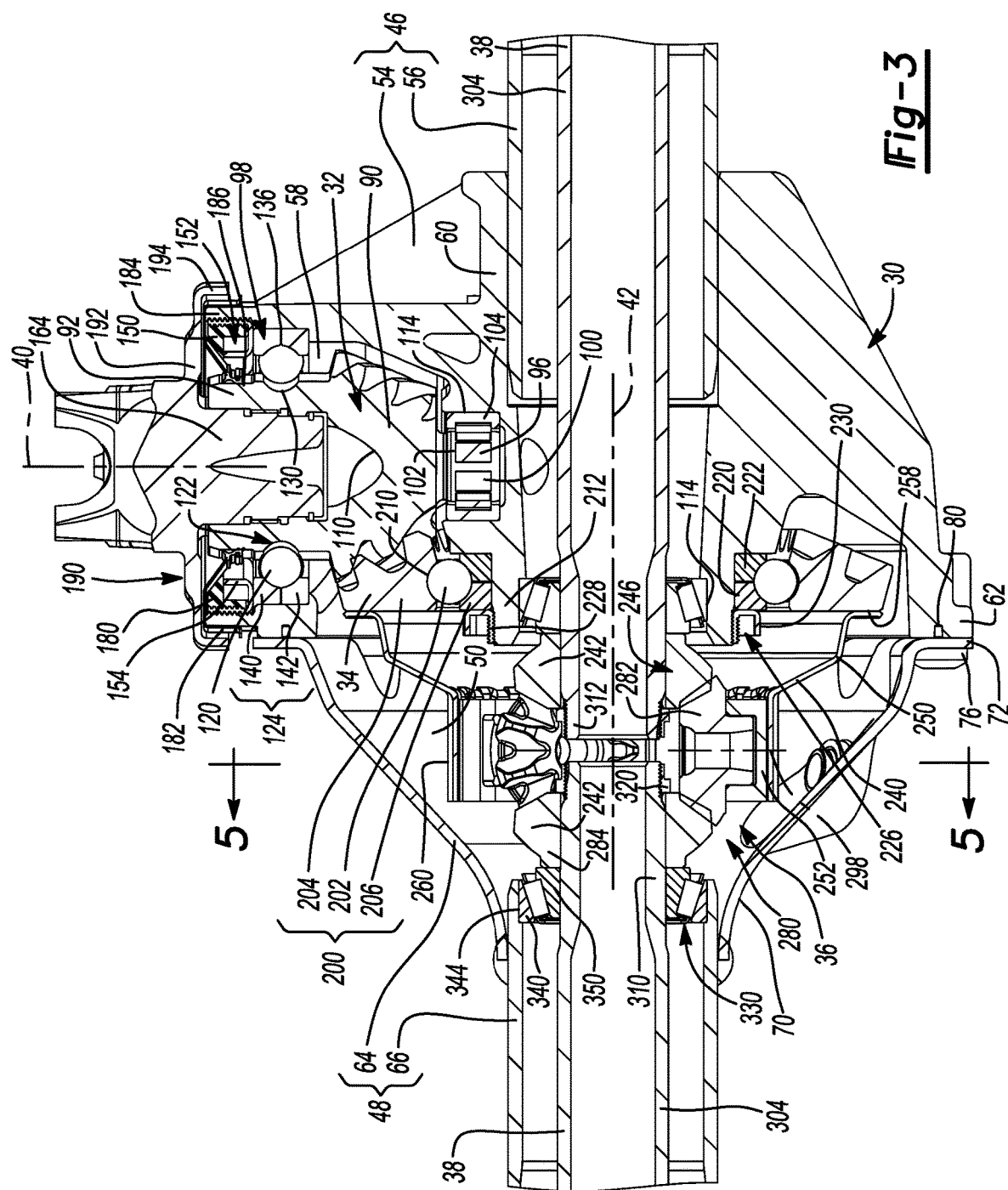

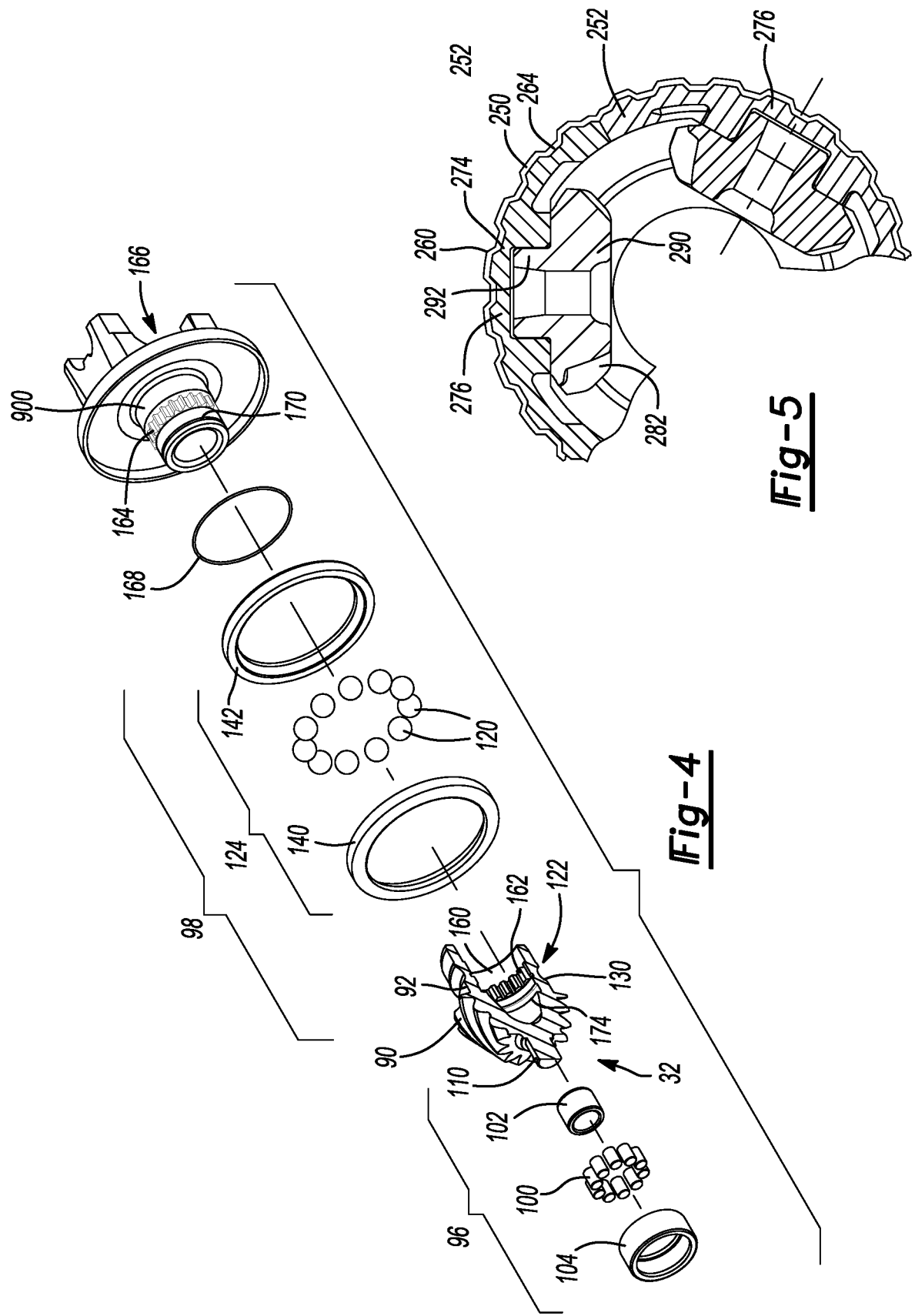

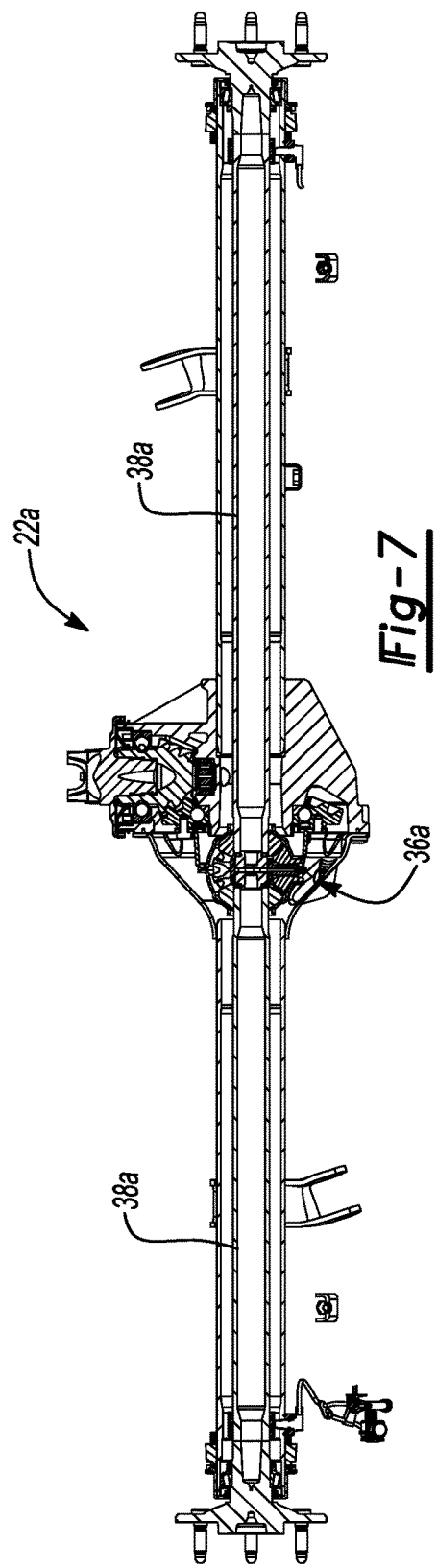
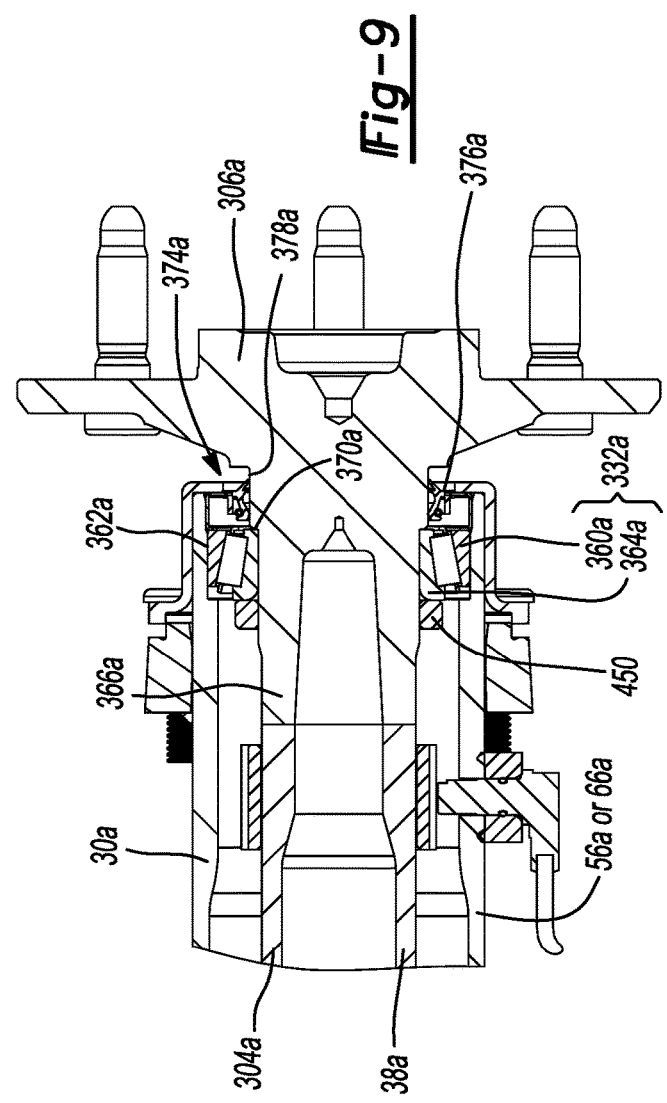

AXLE ASSEMBLY

CROSS-REFERENCE TO RELATED APPLICATIONS

This application is a continuation of U.S. patent application Ser. No. 15/151,831 filed May 11, 2016, which is a continuation of U.S. patent application Ser. No. 14/629,614 filed Feb. 24, 2015, which is a continuation of U.S. patent application Ser. No. 14/244,117 filed Apr. 3, 2014 (now U.S. Pat. No. 9,103,427 issued Aug. 11, 2015), which is a continuation of U.S. patent application Ser. No. 14/205,535 filed Mar. 12, 2014 (now U.S. Pat. No. 9,157,515 issued Oct. 13, 2015), which claims the benefit of U.S. Provisional Patent Application No. 61/787,547 filed Mar. 15, 2013. The disclosure of each of the above-identified patent applications is incorporated by reference as if fully set forth in detail herein.

FIELD

The present disclosure relates to an axle assembly.

BACKGROUND

This section provides background information related to the present disclosure which is not necessarily prior art.

Modern automotive vehicles, particularly light trucks, typically employ beam axles that are constructed in the style of a Banjo-type axle or a Salisbury-type axle. As is known in the art, a Banjo-type axle employs a housing that is fabricated of two identical beam halves, which are welded to one another on the front and rear edges where the beam halves abut one another. A housing for a conventional Banjo-type axle is disclosed in U.S. Pat. No. 2,674,783. As is also known in the art, a Salisbury-style axle employs a housing that includes a center carrier and a pair of axle tubes that are pressed into or otherwise permanently affixed to the center carrier. A housing for a Salisbury-type axle is disclosed in U.S. Pat. No. 7,878,059.

While such axle housings are satisfactory for their intended purposes, there remains a need in the art for an improved axle assembly.

SUMMARY

This section provides a general summary of the disclosure, and is not a comprehensive disclosure of its full scope or all of its features.

In one form, the present teachings provide an axle assembly that includes a housing, an input pinion, a ring gear, a ring gear bearing and a pair of axle shafts. The input pinon is mounted to the axle housing for rotation about a first axis. The ring gear is received in the axle housing and is meshingly engaged with the input pinion. The ring gear bearing supports the ring gear for rotation relative to the housing about a second axis. The ring gear bearing has a plurality of bearing elements and is abutted against a shoulder formed on the axle housing that is positioned along the second axis at a location that is between the first axis and the first bearing elements. The differential assembly has a differential case, which is coupled to the ring gear for rotation therewith, and a pair of output members. Each of the axle shafts is coupled for rotation with a corresponding one of the output members. Power transmission between the input pinon and the ring gear that drives the ring gear about the second axis in a first rotary direction generates a first thrust load that is directed along the second axis in a first direction. Power transmission between the input pinion and the ring gear that drives the ring gear about the second axis in a second rotary direction opposite the first rotary direction generates a second thrust load that is directed along the second axis in a second direction that is opposite the first direction. Each of the first and second thrust loads is transmitted through the first bearing elements when the first and second thrust loads are transmitted between the ring gear and the housing.

In another form, the present teachings provide an axle assembly that includes a housing, an input pinion, a ring gear, a differential assembly, and a ring gear bearing. The input pinion has a pinion gear and is received in the housing for rotation about a first axis. The ring gear is meshed with the pinion gear and is rotatable about a second axis that is transverse to the first axis. The differential assembly has a differential case and a pair of output members. The differential case is driven by the ring gear. The ring gear bearing supports the ring gear for rotation relative to the housing about the second axis. The ring gear bearing has a plurality of bearing elements, an inner race and an outer race. A bearing groove is formed into the ring gear. The bearing elements are received into the bearing groove such that the outer bearing race is unitarily and integrally formed with the ring gear.

In some forms of this axle assembly, (a) the bearing elements comprise bearing balls; (b) the ring gear bearing can be an angular contact bearing; (c) the ring gear bearing can be a four-point contact bearing; (d) the inner race can include a first inner race member and a second inner race member that are axially separated from one another along the second axis; (e) the axle assembly can further include a bearing adjuster that can be threadably coupled to the housing and configured to move the first inner bearing race member axially toward the second inner bearing race member to pre-load the ring gear bearing; (f) the outer race can include a first outer race member and a second outer race member that can be axially separated from one another along the second axis; (g) the housing can have a first housing member and a second housing member that contact one another in a housing plane that is perpendicular to the second axis; (h) the second housing member can be configured to apply a force that is transmitted through the first outer bearing race to preload the ring gear bearing; (i) the differential assembly can include a differential gearset having a plurality of differential pinions and a pair of side gears that are meshed with the differential pinions; (j) a ball bearing having a plurality of bearing balls can support the input pinion for rotation relative to the housing, the differential pinions can be disposed about differential pinion axes for rotation relative to the differential case, the differential pinion axes can be disposed in a first bearing plane, and the first bearing plane can be located along the second axis between a second bearing plane extending through centers of the bearing balls of the ring gear and a plane extending perpendicular to the second axis and through one of the bearing balls of the ball bearing that supports the input pinion that is closest to the first bearing plane; (k) each of the differential pinions can have a pinion shaft that is received into a mount structure defined by the differential case; (l) the ring gear can support the differential case for rotation relative to the housing; (m) the differential case can be directly engaged to the ring gear such that rotary power is transmitted directly from the ring gear to the differential case; (n) the differential assembly can include a differential gearset having a plurality of differential pinions and a pair of side gears that are meshed with the differential pinions; (o)

the differential pinions can be directly engaged to the ring gear such that rotary power is transmitted directly from the ring gear to the differential pinions; (p) at least a portion of the differential pinions are mounted on a cross-pin for rotation and the cross-pin is directly engaged to the ring gear such that rotary power is transmitted directly from the ring gear to the cross-pin; (q) at least a portion of the differential assembly can be supported for rotation relative to the housing on a pair of differential bearings, and a first one of the differential bearings is intersected by a plane that extends through a center of the bearing elements in the ring gear bearing; (r) the housing can have a first housing member and a second housing member that can adjoin one another about a plane that is perpendicular to the second axis; and/or (s) the differential case can be formed of sheet metal.

In still another form, the present teachings provide an axle assembly that includes a housing, an input pinion, a ring gear and a differential assembly. The input pinion has a pinion gear. The input pinion is received in the housing and is rotatable about a first axis. The ring gear is meshed with the pinion gear and is rotatable about a second axis that is transverse to the first axis. The differential assembly has a differential gearset and a differential case. The differential gearset has a plurality of bevel pinions and a pair of side gears that are meshingly engaged to the bevel pinions. The differential case has a case member and a plurality of pinion mounts. A first axial end of the case member is fixed to the ring gear for rotation therewith. The pinion mounts are assembled to the case member. The pinion mounts are non-rotatably coupled to the case member and are configured to support the bevel pinions for rotation relative to the case member about respective bevel pinion axes.

In yet another form, the present teachings provide an axle assembly that includes a housing, an input pinion, a ring gear, a differential assembly, a head bearing and a tail bearing. The input pinion has a pinion gear and a pinion shaft. The input pinion is received in the housing and is rotatable about a first axis. The ring gear is meshed with the pinion gear and is rotatable about a second axis that is transverse to the first axis. The differential assembly has a differential case and a pair of output members. The differential case is driven by the ring gear. The head and tail bearings support the input pinion for rotation relative to the housing about the first axis. The head bearing and the tail bearing are disposed along the first axis on opposite sides of the pinion gear. The tail bearing is configured to handle loads directed along the first axis from the input pinion to the housing in a direction from the head bearing to the tail bearing. The tail bearing comprises an inner bearing race, which is defined by a bearing groove that is formed into the pinion shaft, and a plurality of bearing elements that are received into the bearing groove such that an inner bearing race of the tail bearing is unitarily and integrally formed with the pinion shaft.

In still another form, the present teachings provide an axle assembly that includes a housing, an input pinion, a ring gear, a differential assembly, a head bearing and a tail bearing. The input pinion has a pinion gear and a pinion shaft. The input pinion is received in the housing and is rotatable about a first axis. The ring gear is meshed with the pinion gear and is rotatable about a second axis that is transverse to the first axis. The differential assembly has a differential case and a pair of output members. The differential case is driven by the ring gear. The head and tail bearings support the input pinion for rotation relative to the housing about the first axis. The head bearing is disposed on a first axial end of the input pinion. The tail bearing is a four-point contact ball bearing having a plurality of bearing elements, an inner race and an outer race. The pinion gear is disposed axially between the tail bearing and the head bearing. A bearing groove is formed into the pinion shaft and the bearing elements are received into the bearing groove such that the inner bearing race is unitarily and integrally formed with the pinion shaft.

In some forms of this axle assembly, (a) the pinion mounts can be slidable relative to the case member in an axial direction along the second axis; (b) the housing has a first housing member and a second housing member that adjoin one another about a plane that is perpendicular to the second axis; (c) the axle assembly includes a pair of axle shafts and each of the side gears is axially and non-rotatably coupled to a corresponding one of the axle shafts; (d) each of the axle shafts has a threaded inboard portion and wherein a threaded fastener engages the threaded inboard portion to axially fix an associated one of the side gears to the threaded inboard portion; (e) the threaded fasteners comprise nuts; (f) the axle assembly further includes a pair of inboard axle shaft bearings, each of the inboard axle shaft bearings supporting an associated one of the axle shafts for rotation relative to the housing, and wherein each of the threaded fasteners produces a preload force that is transmitted through the associated one of the side gears and into an associated one of the inboard axle shaft bearings; (g) the axle assembly further includes a pair of outboard axle shaft bearings, each of the outboard axle shaft bearings supporting a corresponding one of the axle shafts; (h) each axle shaft includes a shaft member and a wheel flange that is welded to an axial end of the shaft member; (i) each axle shaft comprises a wheel flange having a shoulder formed thereon, and wherein the outboard axle shaft bearings are abutted against the shoulders; (j) the axle assembly further includes a pair of outboard axle shaft seals, each of the outboard axle shaft seals being sealingly engaged to the housing and a corresponding one of the wheel flanges; (k) axial positioning of the pinion mounts along the second axis is based in part on positions of the side gears along the second axis relative to the housing and an amount by which the side gears are axially separated from one another along the second axis; (l) the case member defines a set of teeth that are disposed parallel to the second axis and wherein the pinion mounts define a plurality of mating teeth that matingly engage the set of teeth defined by the case member; (m) the pinion mounts are formed of plastic; (n) the pinion mounts are formed of powdered metal; (o) the pinion mounts are formed of cast metal; and/or (p) the case member is welded to the ring gear.

In yet another form, the present disclosure provides an axle assembly that includes a carrier housing, an input pinion, a ring gear, a case, a first bearing assembly, a second bearing assembly and a third bearing assembly. The input pinion, which has a plurality of pinion teeth, is received in the carrier housing and is rotatable about a first axis. The ring gear is received in the carrier housing and is rotatable about a second axis that is not parallel to the first axis. The ring gear has a plurality of ring gear teeth. The case is received in the carrier housing and is coupled to the ring gear for rotation about the second axis. The first bearing assembly supports the input pinion for rotation about the first axis relative to the carrier housing. The first bearing assembly has a first outer bearing race that is mounted to the carrier housing at a location along the first axis between the case and the ring gear teeth. The second bearing assembly supports the input pinion for rotation about the first axis relative to the carrier housing. The second bearing assembly is disposed along the first axis on a side of the pinion teeth that is opposite the first bearing. The third bearing assembly supports the ring gear for rotation about the second axis relative to the carrier housing. The third bearing assembly is disposed along the second axis on a side of the ring gear teeth that is opposite the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic illustration of an exemplary vehicle having a (rear) axle assembly constructed in accordance with the teachings of the present disclosure;

FIG. 2 is a longitudinal section view of the axle assembly of FIG. 1;

FIG. 3 is an enlarged portion of FIG. 2, illustrating an input pinion, a ring gear, a differential assembly and a portion of an axle housing in more detail;

FIG. 4 is an exploded perspective view of a portion of the axle assembly of FIG. 1, illustrating the input pinion, a head bearing and a tail bearing in more detail;

FIG. 5 is a section view taken along the line 5-5 of FIG. 3;

FIG. 7 is a view similar to that of FIG. 2 but illustrating another axle assembly constructed in accordance with the teachings of the present disclosure;

FIG. 9 is an enlarged portion of FIG. 7, illustrating a wheel end of the axle assembly in more detail;

Figure 25:
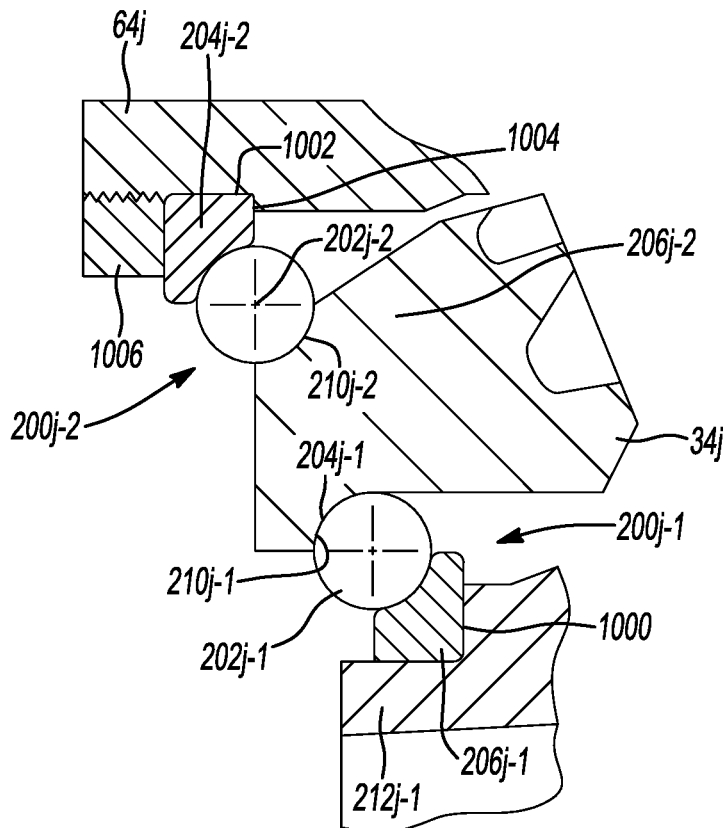
Figure 26:
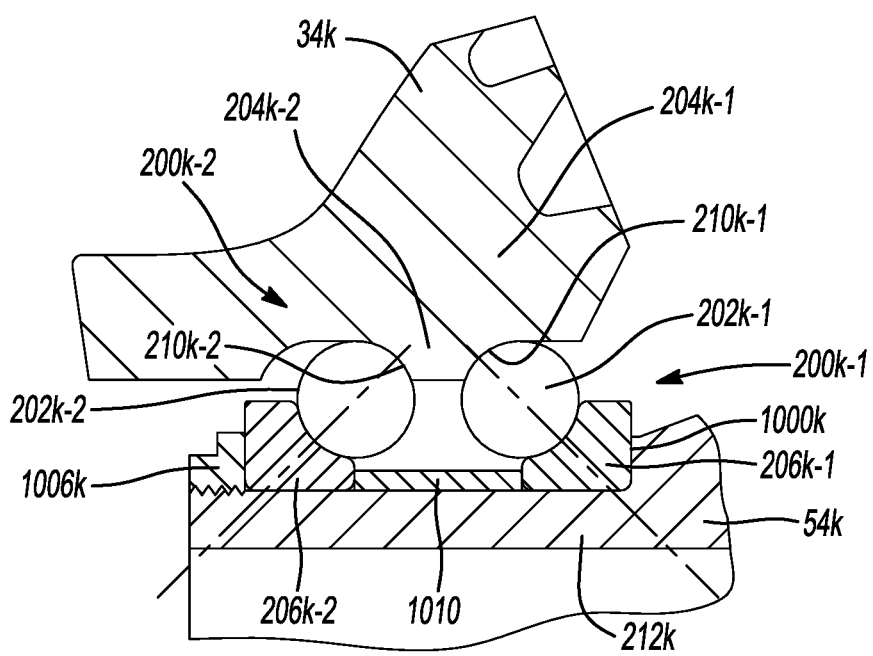

FIG. 25 is a longitudinal section view of a portion of yet another axle assembly constructed in accordance with the teachings of the present disclosure, the view depicting the mounting of the ring gear on inner and outer ring gear bearings; and FIG. 26 is a longitudinal section view of a portion of still another axle assembly constructed in accordance with the teachings of the present disclosure, the view depicting the mounting of the ring gear on a pair of inner ring gear bearings.

Corresponding reference numerals indicate corresponding parts throughout the several views of the drawings.

DETAILED DESCRIPTION

With reference to FIG. 1 of the drawings, an exemplary vehicle having an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

With reference to FIGS. 2 and 3, the rear axle assembly 22 can include a housing 30, an input pinion 32, a ring gear 34, a differential assembly 36, and a pair of axle shafts 38. The input pinion 32 can be rotatable about a first axis 40, while the ring gear 34 and the differential assembly 36 can be rotatable about a second axis 42 that can be transverse (e.g., perpendicular) to the first axis 40.

With reference to FIG. 3, the housing 30 can comprise first and second housing structures 46 and 48, respectively, that can be fixedly but removably coupled to one another. The first and second housing structures 46 and 48 can cooperate to define a differential cavity 50 into which the differential assembly 36 can be received.

The first housing structure 46 can comprise a first carrier member 54 and a first axle tube 56. The first carrier member 54 can be formed of an appropriate material, such as cast iron or aluminum, and can define a pinion bore 58, a first tube collar 60, and a first joint flange 62. The pinion bore 58 can extend along the first axis 40 and can be configured to receive the input pinion 32. The first tube collar 60 can be a tubular structure that can be configured to receive the first axle tube 56. The first axle tube 56 can be a hollow structure that can be press-fit into the first tube collar 60. One or more slug welds (not shown) can be employed to inhibit axial and/or radial movement of the first axle tube 56 relative to the first carrier member 54.

The second housing structure 48 can comprise a second carrier member 64 and a second axle tube 66. The second carrier member 64 can be formed of an appropriate material, such as sheet or plate steel, and can define a second tube collar 70 and a second joint flange 72. The second tube collar 70 can be a tubular structure that can be configured to receive the second axle tube 66. A plurality of threaded fasteners 76 (only one shown) can be employed to fixedly but removably couple the second carrier member 64 to the first carrier member 54 such that the first and second joint flanges 62 and 72 abut or adjoin one another in a plane that is perpendicular to the second axis 42. In the particular example provided, the threaded fasteners 76 are thread-forming screws that are received through holes (not specifically shown) in the second joint flange 72 and driven into holes (not specifically shown) in the first joint flange 62 to both form threads in the first carrier member 54 (on their initial installation to the first carrier member 54) and to generate a clamp load that secures the first and second carrier members 54 and 64 to one another. A seal member, such as a gasket 80, can be disposed between and sealingly engaged to the first and second carrier members 54 and 64. The second axle tube 66 can be a hollow structure that can be received in the second tube collar 70 and fixedly coupled to the second carrier member 64. In the particular example provided, the second axle tube 66 is welded to the second tube collar 70.

Figure 4A:
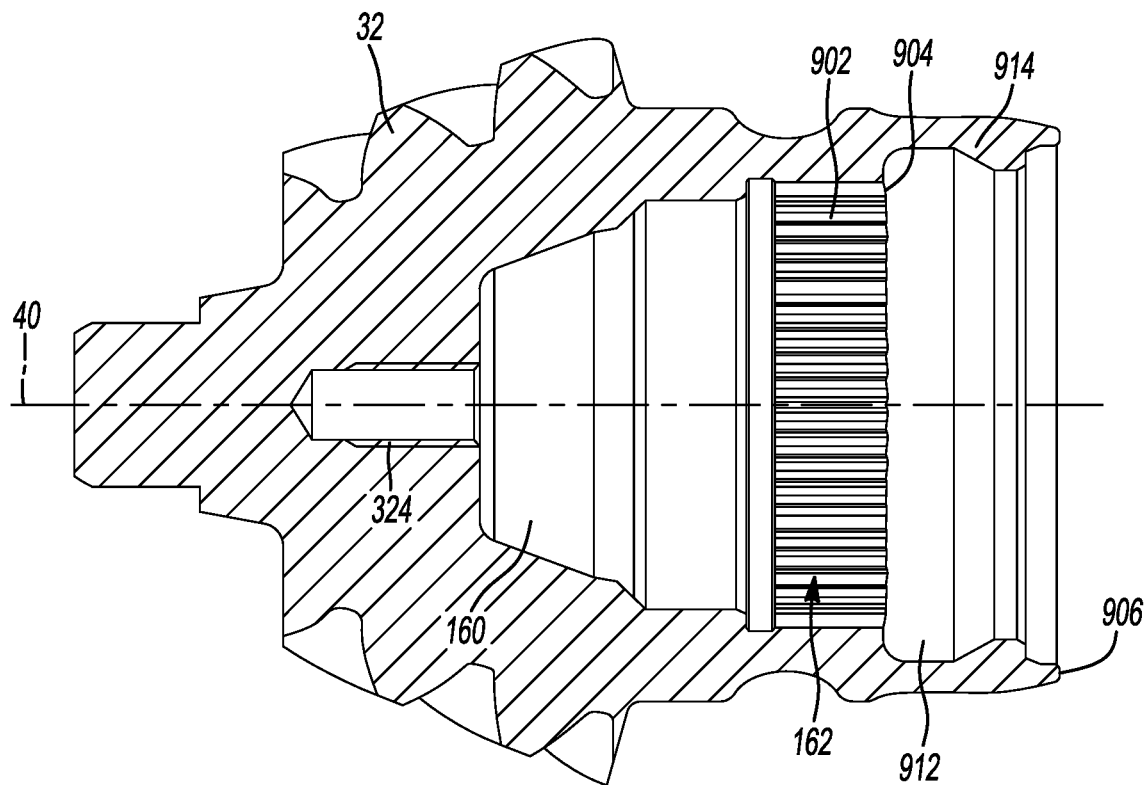
FIG. 4A is a longitudinal sectional view of the input pinion shown in FIG. 4.
Figure 4B:
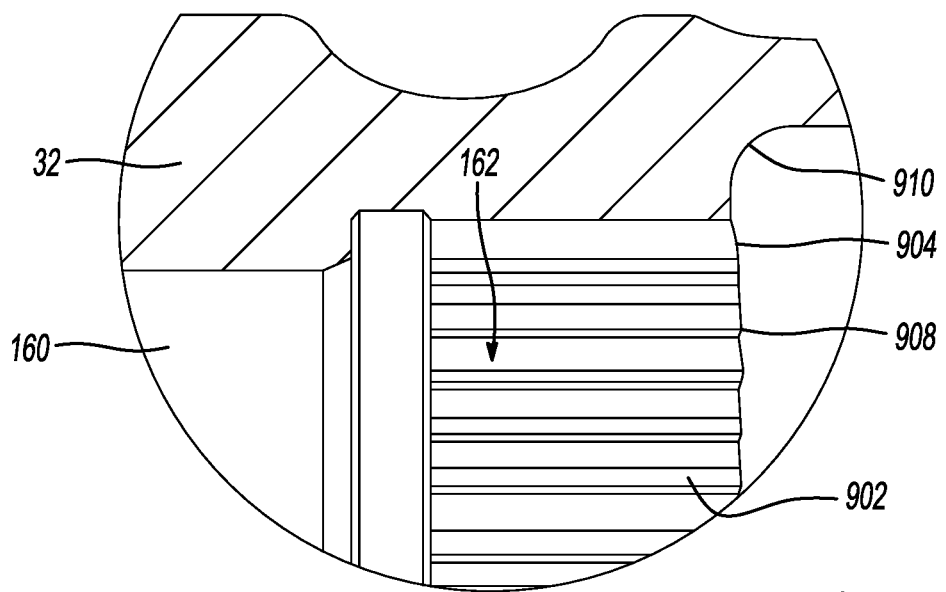
FIG. 4B is an enlarged view of a portion of FIG. 4B.

With reference to FIGS. 3 and 4, the input pinion 32 can include a pinion gear 90 and a pinion shaft 92 that can be fixed to and rotate with the pinion gear 90. In the particular example provided, the pinion gear 90 and the pinion shaft are integrally and unitarily formed from a single piece of steel. The input pinion 32 can be received in the pinion bore 58 in the housing 30 and can be supported for rotation relative to the housing 30 about the first axis 40 by a head bearing 96, which can be disposed on a first axial end of the input pinion 32, and a tail bearing 98 that can be disposed on a second, opposite axial end of the input pinion 32. The pinion gear 90 can be disposed along the first axis 40 axially between the head bearing 96 and the tail bearing 98.

The head bearing 96 can comprise a plurality of bearing elements 100, an inner bearing race 102 and an outer bearing race 104. The bearing elements 100 can be any type of element that can roll relative to the inner and outer bearing races 102 and 104. In the particular example provided, the bearing elements 100 are cylindrically-shaped rollers. The inner bearing race 102 can be formed on a cylindrical extension 110 that extends from the pinion gear 90 on a side opposite the pinion shaft 92. The bearing elements 100 of the head bearing 96 can be in direct contact with the cylindrical surface of the cylindrical extension 110. The outer bearing race 104 can be received in a pocket 114 formed in the first carrier member 54 and fixedly coupled the first carrier member 54 (e.g., via a press-fit).

The tail bearing 98 can have a plurality of bearing elements 120, an inner bearing race 122 and an outer bearing race 124. The bearing elements 120 can be any type of element that can roll relative to the inner and outer bearing races 122 and 124. In the particular example provided, the bearing elements 120 comprise bearing balls. The inner bearing race 122 can comprise a bearing groove 130 that can be formed into a desired portion of the input pinion 32, such as the pinion shaft 92. The bearing elements 120 can be received into the bearing groove 130 such that the inner bearing race 122 is unitarily and integrally formed with the pinion shaft 92. The outer bearing race 124 can be received in a bearing bore 136 formed in the first carrier member 54. The tail bearing 98 can be an angular contact bearing, but in the particular example provided, the tail bearing 98 is a four-point contact ball bearing in which the bearing balls make contact at two points with the surface of the bearing groove 130 and with first and second outer race members 140 and 142, respectively, which cooperate to form the outer race 124. The first outer race member 140 can be axially separated from the second outer race member 142 along the first axis 40. A bearing adjuster 150 can be threadably engaged to the first carrier member 54 and can be configured to move the first outer bearing race member 140 toward the second outer bearing race member 142 to preload the tail bearing 98. The bearing adjuster 150 can be formed of sheet steel and can have a threaded outside diameter 152 and a hollow tool engaging portion 154 through which the pinion shaft 92 can extend. The tool engaging portion 154 has an octagonal shape in the example provided, which permits the bearing adjuster 150 to be installed using a socket wrench. The bearing adjuster 150 can be deformable to allow a portion of it to be staked into a recess formed in the first carrier member 54 to inhibit rotation of the bearing adjuster 150 after the preload on the tail bearing 98 has been set.

With specific reference to FIG. 4, the input pinion 32 can define an internal cavity 160, which can extend through the pinion shaft 92 on a side opposite the pinion gear 90, and a first coupling portion 162 that can be fixedly and non-rotatably coupled to a second coupling portion 164 on a yoke flange 166. In the example provided, the first coupling portion 162 comprises a plurality of internal spline teeth that border the internal cavity 160. The internal spline teeth of the first coupling portion 162 can be configured to matingly engage external spline teeth formed on the second coupling portion 164. An axial retaining means, such as a snap ring, a screw or one or more stakes formed in a staking operation, can be employed to retain the yoke flange 166 to the input pinion 32. For example, a snap ring 168 can be received in a groove 170 in the second coupling portion 164 and abutted against a feature, such as a shoulder 174, on the first coupling portion 162 to thereby axially fix the second coupling portion 164 to the first coupling portion 162. It will be appreciated, however, that the axial retaining means used in addition to the internal and (mating) external spline teeth is optional. It will also be appreciated that other means for retaining the yoke flange 166 to the input pinion 32 could be employed, such as a plurality of barbs or serrations on one or both of the yoke flange 166 and the input pinion 32.

If desired, the second coupling portion 164 on the yoke flange 166 could be formed by pressing a pin portion 900 of the yoke flange 166 into the internal cavity 160. For example, the input pinion 32 could be sufficiently hardened (steel) and pin portion 900 of the yoke flange 166 could be formed a relatively softer material, such as an unhardened steel or aluminum, which could deform as the pin portion 900 is pressed into the internal cavity 160. In some instances, the input pinion 32 could function as a broach-like tool that machines the pin portion 900 as it is inserted into the internal cavity 160. With additional reference to FIGS. 4A and 4B, the internal cavity 160 and the internal spline teeth 902 of the first coupling portion 162 can cooperate to form a structure that is configured to both machine mating external spline teeth onto the yoke flange 166 and to contain the chips or swarf that is formed when the mating external spline teeth are formed. Each of the internal spline teeth 902 can be formed with a frustoconically-shaped face 904 that tapers away from a rear end 906 of the input pinion 32 with increasing distance from the first axis 40. The amount of taper can be about 5 degrees to about 20 degrees (as measured from the frustoconically-shaped face 904 to a line perpendicular to the first axis 40), and preferably about 15 degrees. The radially inward edge 908 of each frustoconically-shaped face 904 can be left sharp, while the radially outward edge of each frustoconically-shaped face 904 can blend into an undercut radius 910 that defines a forward end of an annular chip containment compartment 912. A rearward end of the chip containment compartment 912 can be defined by a radially inwardly extending wall member 914. The radially inwardly extending wall member 914 can be formed in any manner that is desired, such as tapering inwardly toward the first axis 40 with increasing distance from the internal spline teeth 902. The chip containment compartment 912 is a space that is disposed about the pin portion 900 of the yoke flange 166 when the pin portion 900 is pressed into the internal cavity 160 to form the second coupling portion 164. It will be appreciated that the radially inward edges 908 of the frustoconically-shaped faces 904 form broach-like cutting elements and that the frustoconically-shaped faces 904 direct the chips (created when the second coupling portion 164 is formed) in a radially outward direction. The rounded geometry of the undercut radius 910 can urge the chips to curl back gently to lessen the likelihood that the chips jam against the input pinion 32 and possibly impart additional loading when the yoke flange 166 is pressed onto the input pinion 32. The chips generated during the formation of the second coupling portion 164 can be contained in the chip containment compartment 912 between the undercut radius 910 and the radially inwardly extending wall member 914. Preferably, the radially inwardly extending wall member 914 is sufficiently close in diameter to the pin portion 900 so that the radially inwardly extending wall member 914 pilots or aligns the pin portion 900 concentrically to the internal spline teeth 902 (and both fore and aft of the internal spline teeth 902) prior to and during the formation of the mating spline teeth on the second coupling portion 164.

For example, the pin portion 900 of the second coupling portion 164 can comprise first and second portions that are formed on opposite sides of the external spline teeth 164 and the first and second portions of the pin portion 900 can slidingly engage first and second surfaces of the internal cavity 160 over distances that are longer along the first axis 40 than a length of the internal spline teeth 902. Also preferably, the radially inwardly extending wall member 914 is sufficiently close in diameter to the pin portion 900 so that the radially inwardly extending wall member 914 forms a barrier that inhibits the egress of chips from a rearward end of the chip containment compartment 912.

Coupling of the yoke flange 166 to the input pinion 32 can be performed, for example, after the input pinion 32 has been installed to the first carrier member 54 and is supported by the tail bearing 98. So that the load associated with the pressing of the yoke flange 166 to the input pinion 32 is not directed to the bearing elements 120 of the tail bearing 98, the input pinion 32 could be supported by an anvil (not shown) that could be received through a hole (not shown) formed in the first carrier member 54 (FIG. 3). The anvil could be removed after the yoke flange 166 has been pressed to the input pinion 32 and the hole in the first carrier member 54 (FIG. 3) could be plugged. The hole could have other uses, such as for inspection of a portion of the axle assembly 22 (FIG. 2) and/or for filling the first carrier member 54 (FIG. 3) with a lubricant, and as such, the plug could be removably coupled to the first carrier member 54 (FIG. 3). Alternatively, the pin portion 900 of the yoke flange 166 can be hollow and a tool, which can be threaded into a threaded hole 324 in the input pinion 32, could be employed to force the yoke flange 166 and the input pinion 32 together (e.g., hydraulically). Moreover, a bolt (not shown) could be inserted through a hole (not shown) in the yoke flange 166 and threadably engaged to the threaded hole 324 in the input pinion 32 to axially and/or rotationally fix the yoke flange 166 to the input pinion 32.

Returning to FIG. 3, a pinion shaft seal 180 can be received between the housing 30 and the pinion shaft 92 of the input pinion 32. In the particular example provided, the pinion shaft seal 180 comprises an annular connection member 182, which is fixedly and sealingly engaged to a tubular portion 184 of the first carrier member 54, and a seal member 186 that is fixed to an internal end of the connection member 182. The seal lip 186 can comprise one or more sealing lips that can be sealingly engaged to the pinion shaft 92. One or more of the sealing lips on the seal member 186 can be received axially through the bearing adjuster 150 and sealingly engaged to the pinion shaft 92. Alternatively, the pinion shaft seal 180 could sealingly engage against a portion of the yoke flange 166.

If desired, a bearing shield 190 can be employed to cover an axial end of the pinion shaft seal 180. In the particular example provided, the bearing shield 190 is unitarily and integrally formed with the yoke flange 166 and includes a radial member 192, which extends radially outwardly from the second coupling portion 164, and a tubular member 194 that can be coupled to a distal end of the radial member 192 and extend axially toward the pinion gear 90.

The ring gear 34 can be meshed with the pinion gear 90 and is rotatable about the second axis 42. A ring gear bearing 200 can support the ring gear 34 for rotation relative to the housing 30 about the second axis 42. The ring gear bearing 200 can comprise a plurality of bearing elements 202, an outer bearing race 204, and an inner bearing race 206. The bearing elements 202 can be any type of element that can roll relative to the inner and outer bearing races 206 and 204. In the particular example provided, the bearing elements 202 comprise bearing balls. The outer bearing race 204 can comprise a bearing groove 210 that can be formed into a desired portion of the ring gear 34, such as the in the toe or inside diametrical surface of the ring gear 34. The bearing elements 202 can be received into the bearing groove 210 such that the outer bearing race 204 is unitarily and integrally formed with the ring gear 34. The inner bearing race 206 can be received on a hub 212 formed on the first carrier member 54. The ring gear bearing 200 can be an angular contact bearing, but in the particular example provided, the ring gear bearing 200 is a four-point contact ball bearing in which the bearing balls make contact at two points with the surface of the bearing groove 210 and with first and second inner race members 220 and 222, respectively, which cooperate to form the inner bearing race 206. The first inner race member 220 can be axially separated from the second inner race member 222 along the second axis 42.

A bearing adjuster 226 can be threadably engaged to the hub 212 and can be configured to move the first inner bearing race member 220 toward the second inner bearing race member 222 to preload the ring gear bearing 200. The bearing adjuster 226 can be formed of sheet steel and can have a threaded inside diameter 228, which can be threadably engaged to the hub 212, and a hollow tool engaging portion 230. The tool engaging portion 230 has an octagonal shape in the example provided, which permits the bearing adjuster 226 to be installed using a socket wrench. The bearing adjuster 226 can be deformable to allow a portion of it to be staked into a recess formed in the first carrier member 54 to inhibit rotation of the bearing adjuster 226 after the preload on the ring gear bearing 200 has been set.

With reference to FIGS. 3 and 5, the differential assembly 36 can include a differential case 240, a pair of output members 242 and a means 246 for permitting speed differentiation between the output members 242. The differential case 240 can comprise a case member 250 and a plurality of pinion mount structures 252. The case member 250 can be formed of an appropriate material, such as sheet or plate steel, and can define a ring gear flange 258 and a coupling portion 260. The ring gear flange 258 can be fixedly coupled to the ring gear 34 in any desired manner, such as with a plurality of threaded fasteners (not shown). In the example provided, the ring gear flange 258 is welded to the heel of the ring gear 34. The case member 250 can taper in a generally frustoconical manner between the ring gear flange 258 and the coupling portion 260. The coupling portion 260 can be a generally tubular structure that can be non-rotatably engaged to the pinion mount structures 252 in any desired manner. In the example provided, the coupling portion 260 includes a plurality of circumferentially spaced-apart spline teeth 264 that are formed parallel to and about the second axis 42.

The pinion mount structures 252 can be shaped in the form of annular segments and can nest together to form an annular structure that can be received into the coupling portion 260. The pinion mount structures 252 can be formed of a suitable material, such as a plastic (e.g., glass-filled Nylon), a powdered metal or a cast metal (e.g., die cast metal). Each of the pinion mount structures 252 can include a plurality of spline teeth 274 and a mount structure 276 that can be configured to transmit rotary power to the speed differentiation means 246. The spline teeth 274 can be formed on an exterior circumferential surface of the pinion mount structures 252 and can be configured to matingly engage the spline teeth 264 of the coupling portion 260.

The speed differentiation means 246 can comprise any means for permitting speed differentiation between the output members 242. For example, the speed differentiation means 246 can include one or more clutches, such as friction clutches (not shown), that can be operated to permit/control speed differentiation between the output members 242. In the particular example provided, the speed differentiation means 246 comprises a differential gearset 280 having a plurality of differential pinions 282 and a pair of side gears 284. Each of the differential pinions 282 can include a pinion member 290 and a mating mount structure 292 that is configured to engage the mount structure 276 of an associated one of the pinion mount structures 252 to receive rotary power therefrom. The pinion members 290 can be bevel pinion gears that can meshingly engage the side gears 284. Each of the output members 242 can be fixedly and non-rotatably coupled to an associated one of the side gears 284. Each of the output members 242 can comprise an internally splined structure that can be mounted on a corresponding one of the axle shafts 38.

In the example provided, the mating mount structures 292 are hollow cylindrical shaft members and the mount structures 276 are holes into which the shaft members (mating mount structures 292) are received. Each of the shaft members can be integrally and unitarily formed with an associated one of the pinion members 290. It will be appreciated, however, that the shaft members could be discrete components that can be fixedly coupled to one or more of the pinion members 290. The pinion mount structures 252 can be configured to support the pinion members 290 for rotation relative to the case member about respective bevel pinion axes 298.

The pinion mount structures 252 are slidable relative to the case member 250 in an axial direction along the second axis 42. Axial positioning of the pinion mount structures 252 along the second axis 42 can be based in part on positions of the side gears 284 along the second axis 42 relative to the housing 30 and an amount by which the side gears 284 are axially separated from one another along the second axis 42. Configuration in this manner permits the pinion mount structures 252 to float along the second axis 42 so that the differential gearset 280 can dictate their position.

Figure 6:
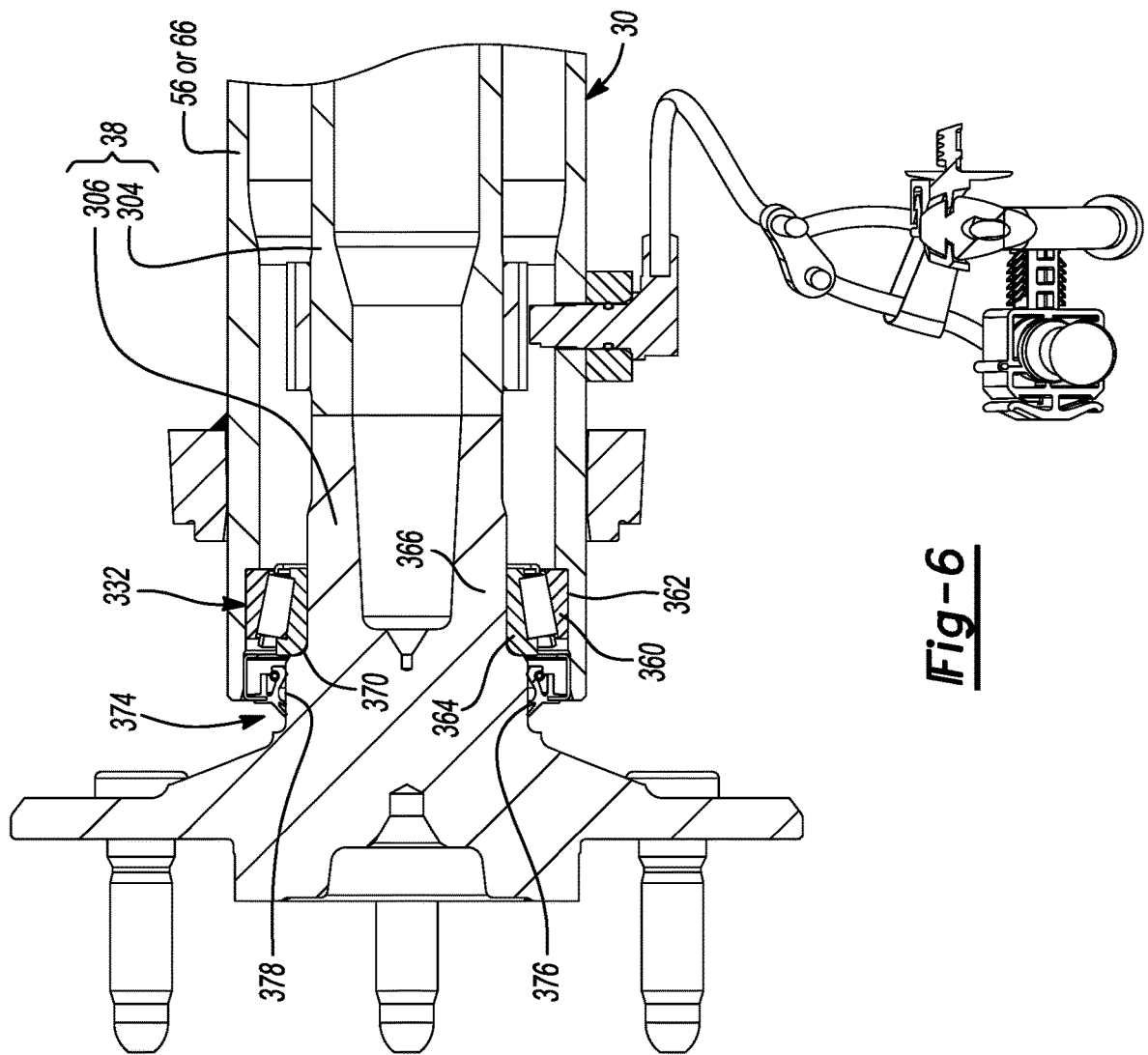
FIG. 6 is an enlarged portion of FIG. 2, illustrating a wheel end of the axle assembly in more detail.

With reference to FIGS. 3 and 6, each of the axle shafts 38 can be fixedly and non-rotatably coupled to an associated one of the output members 242. Each of the axle shafts 38 can have a shaft member 304 and a wheel flange 306 that can be fixedly coupled to an axial outboard end of the shaft member 304. In the example provided, the shaft member 304 is a hollow tube and is welded to the wheel flange 306 via a suitable welding process, such as friction welding, but it will be appreciated that other fastening means, such as a splined connection that is mechanically fastened (e.g., threaded fasteners), could be employed in the alternative. The shaft member 304 can have an inboard end (shown in FIG. 3), which can include an externally splined structure 310 and a plurality of threads 312, and an outboard end (shown in FIG. 6).

With reference to FIG. 3, the externally splined structure 310 can be configured to matingly engage the internally splined structure on an associated one of the output members 242. A threaded fastener 320 can be engaged to the plurality of threads 312 to axially fix an associated one of the output members 242 to a corresponding one of the shaft members 304. The plurality of threads 312 can be external threads that can be formed inboard of the externally splined structure 310 and the threaded fastener 320 can comprise a nut. Any desired means can be employed to inhibit rotational movement of the nut relative to the axle shaft 38, including staking, adhesives, and/or a locking tab.

With reference to FIGS. 3 and 6, each axle shaft 38 can be supported for rotation relative to a corresponding one of the first and second axle tubes 56 and 66 by an inboard axle shaft bearing 330 (FIG. 3) and an outboard axle shaft bearing 332 (FIG. 6). The inboard axle shaft bearing 330 can be any type of bearing, such as a tapered roller bearing, and can include an outer bearing race 340 and an inner bearing race 350 that can be received on an associated one of the shaft members 304 and abutted against a corresponding one of the output members 242. The outer bearing races 340 can be received into a pocket 342 formed in an inboard axial end of the hub 212 on the first carrier member 54 and a pocket 344 formed in an inboard axial end of the second axle tube 66. In the example provided, each of the threaded fasteners 320 is configured to produce a preload force that is transmitted through one of the side gears 284 and into one of the inboard axle shaft bearings 330.

The outboard axle shaft bearings 332 can be any type of bearing, such as a tapered roller bearing, and can include an outer bearing race 360, which can be received into a pocket 362 formed in an outboard axial end of the first axle tube 56 or the second axle tube 66, and an inner bearing race 364 that can be received on a shaft portion 366 of the wheel flange 306. The inner bearing race 364 can be abutted against a shoulder 370 formed on the wheel flange 306. A pair of outboard axle shaft seals 374 can be employed to form seals between the housing 30 and the axle shafts 38. Each of the axle shaft seals 374 can be received into an associated one of the first and second axle tubes 56 and 66 and can have a lip seal 376 that can be sealingly engaged to a seal surface 378 on the wheel flange 306.

It will be appreciated that as the present example employs tapered roller bearings for the inboard and outboard axle shaft bearings 330 and 332, it is necessary to preload these bearings. While the axle assembly 22 (FIG. 2) may be assembled in various different ways, we presently envision that the axle shafts 38, the output members 242, the inboard and outboard axle shaft bearings 330 and 332, and the threaded fasteners 320 can be assembled to the first and second housing structures 46 and 48 prior to the assembly of the first and second housing structures 46 and 48 to one another. The ring gear 34 and the ring gear bearing 200 can be installed to the first housing structure 46. In either order, the differential pinions 282 can be assembled to the pinion mount structures 252 and the pinion mount structures 252 can be installed to the coupling portion 260 of the differential case 240. The differential pinions 282 can be meshed with the side gear 284 that is coupled to the axle shaft 38 that is mounted in the first housing structure 46. The gasket 80 can be mounted to the first carrier member 54. The second housing structure 48 can be positioned relative to the first housing structure 46 to cause the side gear 284 that is coupled to the axle shaft 38 that is mounted in the second housing structure 48 to mesh with the differential pinions 282. The second joint flange 72 on the second carrier member 64 can be adjoin the first joint flange 62 on the first carrier member 54. Depending on the configuration of the gasket 80, portions of the first and second joint flanges 62 and 72 may actually abut (contact) one another as is the case in the illustrated example. Alternatively, the gasket 80 could be disposed between the first and second joint flanges 62 and 72 so as to inhibit contact between the first and second joint flanges 62 and 72.

It will be appreciated that in the particular example provided, a portion of the differential assembly 36 (e.g., the side gears 284) is supported for rotation relative to the housing 30 via the inboard axle shaft bearing 330 and as such, the inboard axle shaft bearing 330 functions in some degree as differential bearings. The inboard axle shaft bearing 330 in the first housing structure 46 can be disposed relative to the ring gear bearing 200 such that a plane extending through the centers of the bearing elements 202 of the ring gear bearing 200 extends through the inboard axle shaft bearing 330 in the first housing structure 46. Stated another way, the inboard axle shaft bearing 330 can be nested under or in-line with the bearing elements 202 of the ring gear bearing 200.

Figure 8:
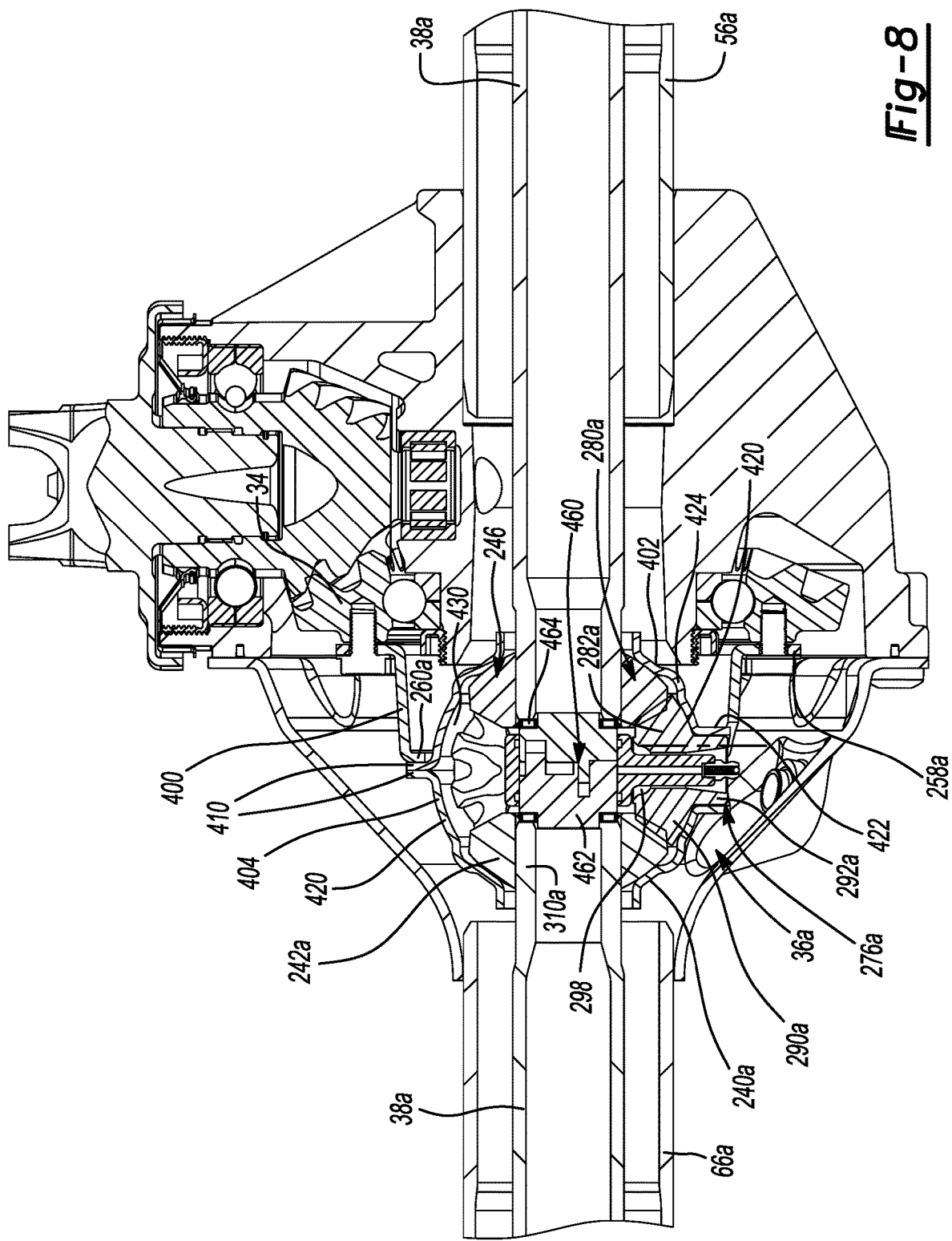
FIG. 8 is an enlarged portion of FIG. 7, illustrating an input pinion, a ring gear, a differential assembly and a portion of an axle housing in more detail.

With reference to FIGS. 7 and 8, a second axle assembly constructed in accordance with the teachings of the present disclosure is generally indicated by reference numeral 22a. The second axle assembly 22a can be generally similar to the axle assembly 22 (FIG. 2), except for the differential assembly 36a and the axle shafts 38a.

With reference to FIG. 8, the differential assembly 36a can include a differential case 240a, a pair of output members 242a and a means 246a for permitting speed differentiation between the output members 242a. The differential case 240a can comprise a first case member 400, a second case member 402 and a third case member 404, each of which being formed of an appropriate material, such as sheet steel. The first case member 400 can define a ring gear flange 258a and a coupling portion 260a. The ring gear flange 258a can be fixedly coupled to the ring gear 34 in any desired manner, such as with a plurality of threaded fasteners (not shown). In the example provided, the ring gear flange 258a is welded to the ring gear 34. The first case member 250 can taper in a generally frustoconical manner between the ring gear flange 258a and the coupling portion 260a. The coupling portion 260a can be fixedly and non-rotatably coupled to the second case member 402. In the example provided, the coupling portion 260a is an annular flange member that extends radially inwardly from a distal end of the frustoconical portion of the first case member 400 and is fixedly coupled (e.g., welded) to a radial flange member 410 on the second case member 402. The second and third case members 402 and 404 are identical stampings and as such, only the second case member 402 will be discussed in detail. In addition to the radial flange member 410, the second case member 402 can have a generally spherical body portion 420, which can be disposed within the radial flange member 410, and a plurality of half-mounts 422. The second and third case members 402 and 404 can be fixedly coupled at their radial flange members 410 (e.g., via welding or threaded fasteners) such that the generally spherical body portions 420 cooperate to define a cavity 430 into which the speed differentiation means 246a can be received. The second and third case members 402 and 404 are coupled to one another such that the half-mounts 422 cooperate to define tubular mount structures 276a.

The speed differentiation means 246a can comprise any means for permitting speed differentiation between the output members 242a. For example, the speed differentiation means 246a can include one or more clutches, such as friction clutches (not shown), that can be operated to permit/control speed differentiation between the output members 242a. In the particular example provided, the speed differentiation means 246a comprises a differential gearset 280a having a plurality of differential pinions 282a and a pair of side gears 284a. Each of the differential pinions 282a can include a pinion member 290a and a shaft member 292a that is received in and engaged to an associated one of the tubular mount structures 276a to thereby receive rotary power from the differential case 240a. The pinion members 290a can be bevel pinion gears that can meshingly engage the side gears 284a. Each of the shaft members 292a can be integrally and unitarily formed with an associated one of the pinion members 290a. It will be appreciated, however, that the shaft members 292a could be discrete components that can be fixedly coupled to one or more of the pinion members 290a. The tubular mount structures 276a can be configured to support the pinion members 290a for rotation relative to the case member about respective bevel pinion axes 298. Each of the output members 242a can be fixedly and non-rotatably coupled to an associated one of the side gears 284a. Each of the output members 242a can comprise an internally splined structure that can be mounted on a corresponding one of the axle shafts 38a.

With reference to FIGS. 8 and 9, each of the axle shafts 38a can be non-rotatably coupled to an associated one of the output members 242a. Each of the axle shafts 38a can have a shaft member 304a and a wheel flange 306a that can be fixedly coupled to an axial outboard end of the shaft member 304a. In the example provided, the shaft member 304a is a hollow tube and is welded to the wheel flange 306a via a suitable welding process, such as friction welding. The shaft member 304a can have an inboard end (shown in FIG. 8), which can include an externally splined structure 310a, and an outboard end (shown in FIG. 9). The externally splined structure 310a can be configured to matingly engage the internally splined structure on an associated one of the output members 242a.

With reference to FIG. 9, each axle shaft 38a can be supported for rotation relative to a corresponding one of the first and second axle tubes 56a and 66a by an outboard axle shaft bearing 332a. The outboard axle shaft bearings 332a can be any type of bearing, such as a tapered roller bearing, and can include an outer bearing race 360a, which can be received into a pocket 362a formed in an outboard axial end of the first axle tube 56a or the second axle tube 66a, and an inner bearing race 364a that can be received on a shaft portion 366a of the wheel flange 306a. An outboard side of the inner bearing race 364a can be abutted against a shoulder 370a formed on the wheel flange 306a and a wedding ring 450, which can be axially fixed to the shaft portion 366a of the wheel flange 306a, can be abutted an inboard side of the inner bearing race 364a. A pair of outboard axle shaft seals 374a can be employed to form seals between the housing 30a and the axle shafts 38a. Each of the axle shaft seals 374a can be received into an associated one of the first and second axle tubes 56a and 66a and can have a lip seal 376a that can be sealingly engaged to a seal surface 378a on the wheel flange 306a.

With renewed reference to FIGS. 8 and 9, it will be appreciated that as the present example employs tapered roller bearings for the outboard axle shaft bearings 332a, it is necessary to preload these bearings. While the axle assembly 22a (FIG. 7) may be assembled in various different ways, we presently envision that the outboard axle shaft bearings 332a are preloaded after the axle assembly 22a (FIG. 7) has been assembled. The axle assembly 22a (FIG. 7) can include a preload mechanism 460 that can be configured to apply a compressive force to the inboard axial ends of the axle shafts 38a. The preload mechanism 460 can comprise any suitable device, such as a jack screw, a suitably sized spacer, or a cylinder. In the particular example provided, the preload mechanism 460 comprises a cylinder 462 and a pair of thrust bearings 464. The cylinder 462 is configured to be filled with an incompressible fluid, such as a grease, that causes the cylinder 462 to elongate and apply a compressive force to the axle shafts 38a. The grease can be input to the cylinder 462 through a one-way valve, such as a Zerk fitting (not specifically shown). Each of the thrust bearings 464 can be abutted against a side of the cylinder 462 and an axial end of one of the axle shafts 38a.

Figure 10:
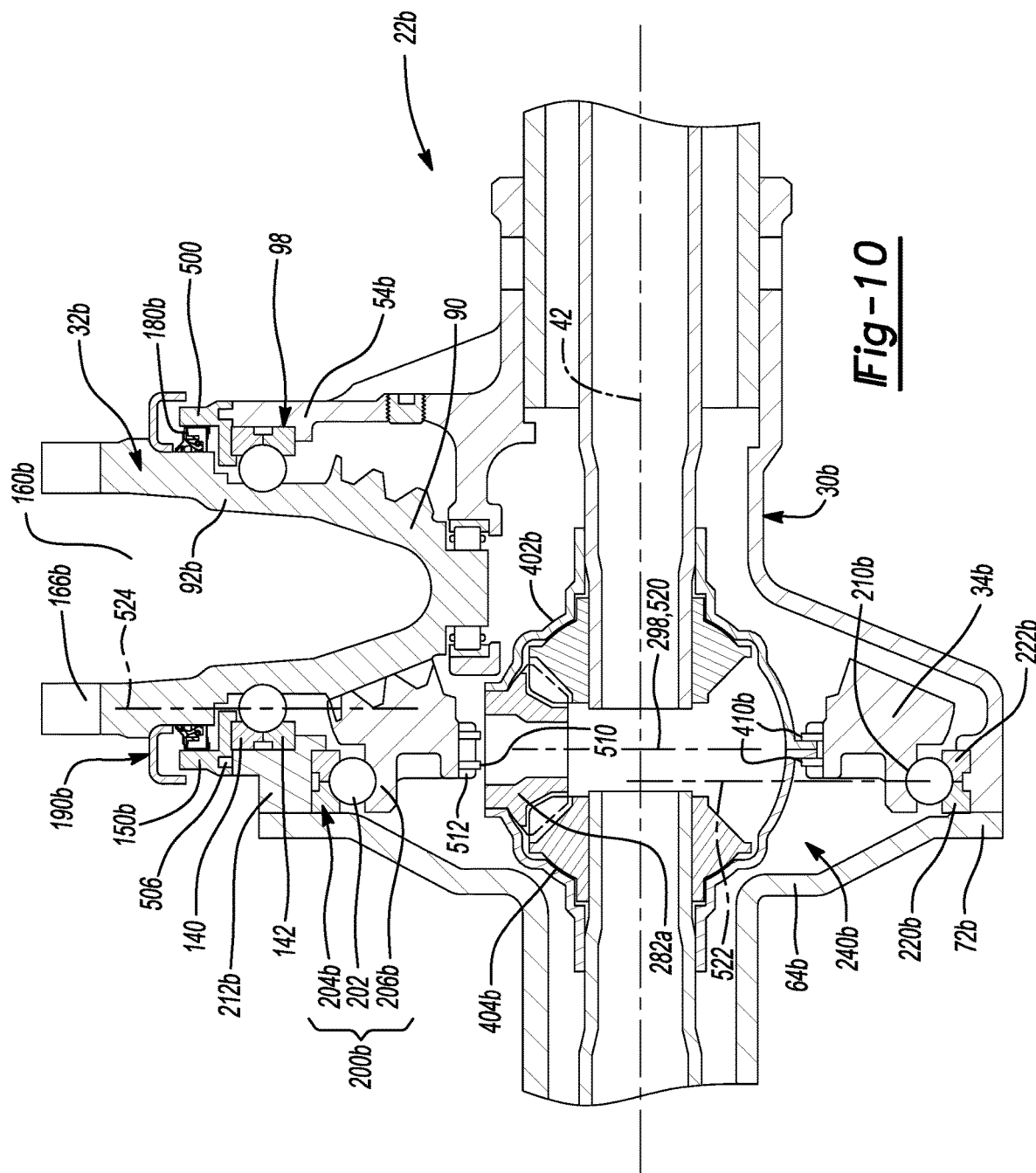
FIGS. 10 and 11 are views similar to that of FIG. 3 but illustrating two other axle assemblies constructed in accordance with the teachings of the present disclosure.

In FIG. 10, a portion of a third axle assembly 22b constructed in accordance with the teachings of the present disclosure is illustrated. The third axle assembly 22b can be generally similar to the axle assembly 22a (FIG. 7), except for the housing 30b, the input pinion 32b, the ring gear 34b, the ring gear bearing 200b and the differential case 240b. The housing 30b is generally similar to the housing 30 (FIG. 3), except that the housing 30b additionally includes a third housing structure 500 that is fixedly but removably coupled to the first carrier member 54b. The third housing structure 500 comprises an integral bearing seat 150b that can be configured to move the first outer bearing race member 140 toward the second outer bearing race member 142 when the third housing structure 500 is installed to the first carrier member 54 to preload the tail bearing 98. A gasket 506 can be received between the first carrier member 54b and the third housing structure 500.

The input pinion 32b can be generally identical to the input pinion 32 (FIG. 3), except that the yoke flange 166b can be unitarily and integrally formed with the pinion gear 90 and the pinion shaft 92b from a single piece of steel. The internal cavity 160b can extend through the yoke flange 166b. The pinion shaft seal 180b can be sealingly engaged to the third housing structure 500 and sealingly engaged to the pinion shaft 92b of the input pinion 32b. The bearing shield 190b can be a discrete component that can be assembled to the input pinion 32b.

The ring gear bearing 200b can comprise a plurality of bearing elements 202, an outer bearing race 204b, and an inner bearing race 206b. The inner bearing race 206b can comprise a bearing groove 210b that can be formed into a desired portion of the ring gear 34b, such as the in the heel or outside diametrical surface of the ring gear 34b. The bearing elements 202 can be received into the bearing groove 210b such that the inner bearing race 206b is unitarily and integrally formed with the ring gear 34b. The outer bearing race 204b can be received on a hub 212b formed on the first carrier member 54b. The ring gear bearing 200b can be an angular contact bearing, but in the particular example provided, the ring gear bearing 200b is a four-point contact ball bearing in which the bearing balls make contact at two points with the surface of the bearing groove 210b and with first and second outer race members 220b and 222b, respectively, which cooperate to form the outer bearing race 204b. The first outer race member 220b can be axially separated from the second outer race member 222b along the second axis 42. The second joint flange 72b on the second carrier member 64b can be configured to move the first outer bearing race member 220b toward the second outer bearing race member 222b to preload the ring gear bearing 200b. If required, one or more shims (not shown) can be disposed between the second joint flange 72b and the first outer bearing race member 220b.

The differential case 240b is similar to the differential case 240a (FIG. 8) except that the second and third case members 402b and 404b are directly coupled to the ring gear 34b so that the first case member 400 (FIG. 8) is not required. In the particular example provided, the radial flange members 410b of the second and third case members 402b and 404b define a plurality of external teeth 510 that are engaged to internal teeth 512 formed on the inside diametrical surface of the ring gear 34b. Accordingly, it will be appreciated that rotary power can be transmitted directly from the ring gear 34b to the differential case 240b and that the ring gear 34b supports the differential case 240b for rotation relative to the housing 30b.

In the particular example illustrated, the differential pinions 282a are disposed about differential pinion axes 298 for rotation relative to the differential case 240b, the differential pinion axes 298 are disposed in a first bearing plane 520, and the first bearing plane 520 is located along the second axis 42 between a second bearing plane 522, which extends through centers of the bearing balls of the ring gear 34b, and a plane 524 that extends perpendicular to the second axis 42 and through one of the bearing balls of the tail bearing 98 that is located closest to the first bearing plane 520.

Figure 11:
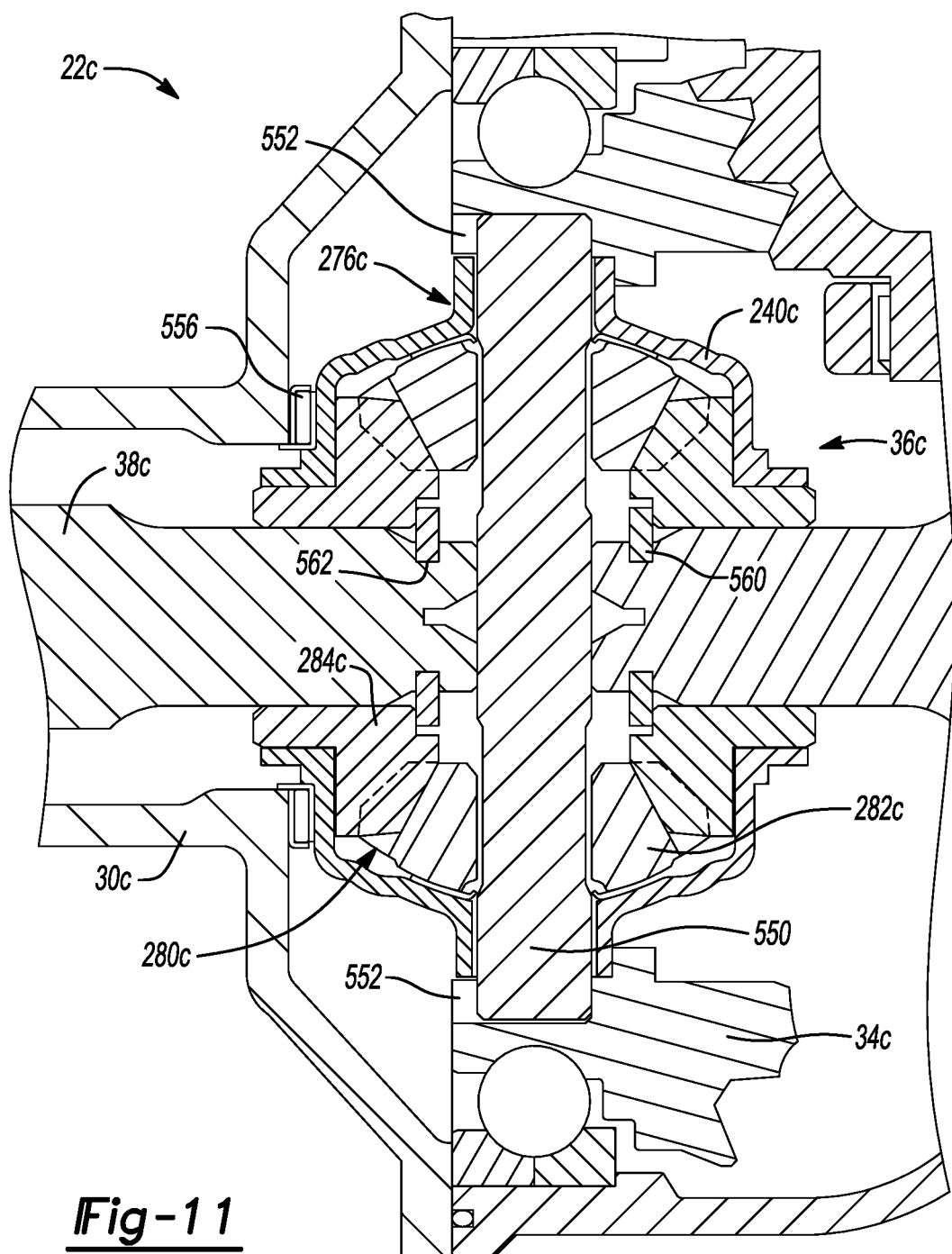

In FIG. 11, a portion of a fourth axle assembly 22c constructed in accordance with the teachings of the present disclosure is illustrated. The fourth axle assembly 22c can be generally similar to the axle assembly 22b (FIG. 10), except for the differential assembly 36c. The differential assembly 36c includes a differential gearset 280c having a cross-pin 550 that is received in the mount structure 276c in the differential case 240c and into slots 552 formed in the ring gear 34c. The differential case 240c is formed of two case halves that are not fixedly coupled to one another in the example provided. Tabs on the case halves can be received into the slots 552 in the ring gear 34c so that the case halves are rotatably coupled to the ring gear 34c. The differential pinions 282c are rotatably mounted on the cross-pin 550. Rotary power can be transmitted directly from the ring gear 34c to the cross-pin 550 (and to the differential case 240c). A thrust bearing 556 can be received between the differential case 240c and the housing 30c. Proximal ends of the axle shafts 38c can abut the cross-pin 550. A snap ring 560 can be received in a ring groove 562 in each axle shaft 38c and the snap ring 560 can abut an inboard surface of a corresponding one of the side gears 284c. Alternatively, the cross-pin 550 can be deleted and differential pinions similar to the differential pinions 282a (FIG. 8) can be employed. In this alternative example, the shaft member 292a (FIG. 8) can be extended somewhat so as to be received into a corresponding one of the slots 552 in the ring gear 34c so that the differential pinions 282a (FIG. 8) are directly engaged to the ring gear 34c such that rotary power is transmitted directly from the ring gear 34c to the differential pinions 282a (FIG. 8).

While not shown, the axle shafts 38c can "float" at the wheel ends. In this regard, the outboard ends of the axle shafts 38c can be mounted on cylindrical roller bearings. It will be appreciated, however, that other mounting configurations for the axle shafts 38c could be employed in the alternative.

Figure 12:
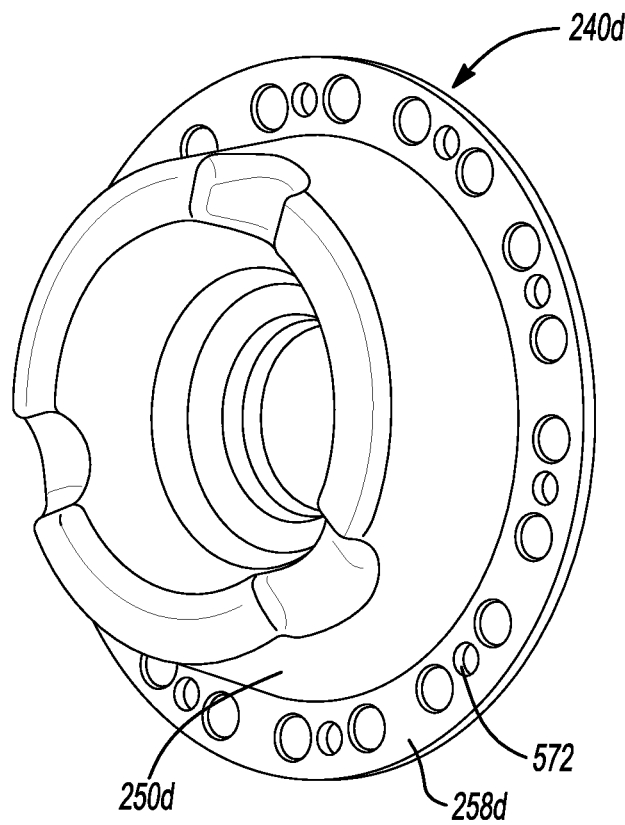
FIGS. 12 and 13 are left and right side perspective views of a portion of a differential assembly constructed in accordance with the teachings of the present disclosure.
Figure 13:
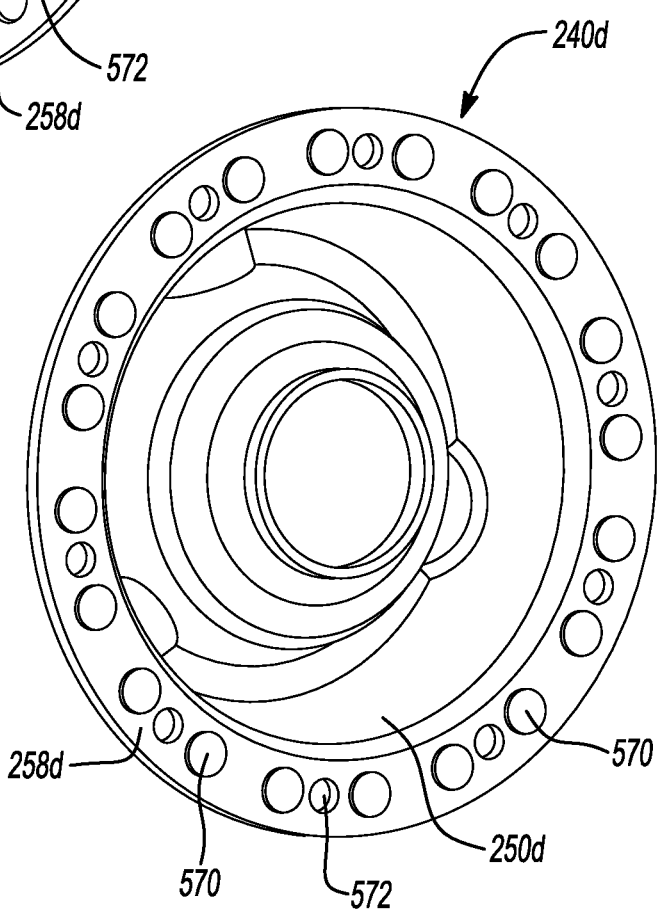

In FIGS. 12 and 13, a portion of an alternately constructed differential case 240d is illustrated. The differential case 240d includes a first case member 250d with a ring gear flange 258d that includes a plurality of projections or embossments 570 that are configured to be received into corresponding holes or slots (not shown) in a ring gear (not shown). Threaded fasteners (not shown) can be received through holes 572 in the ring gear flange 258d and threadably engaged to threaded holes (not shown) in the ring gear.

Figure 14:
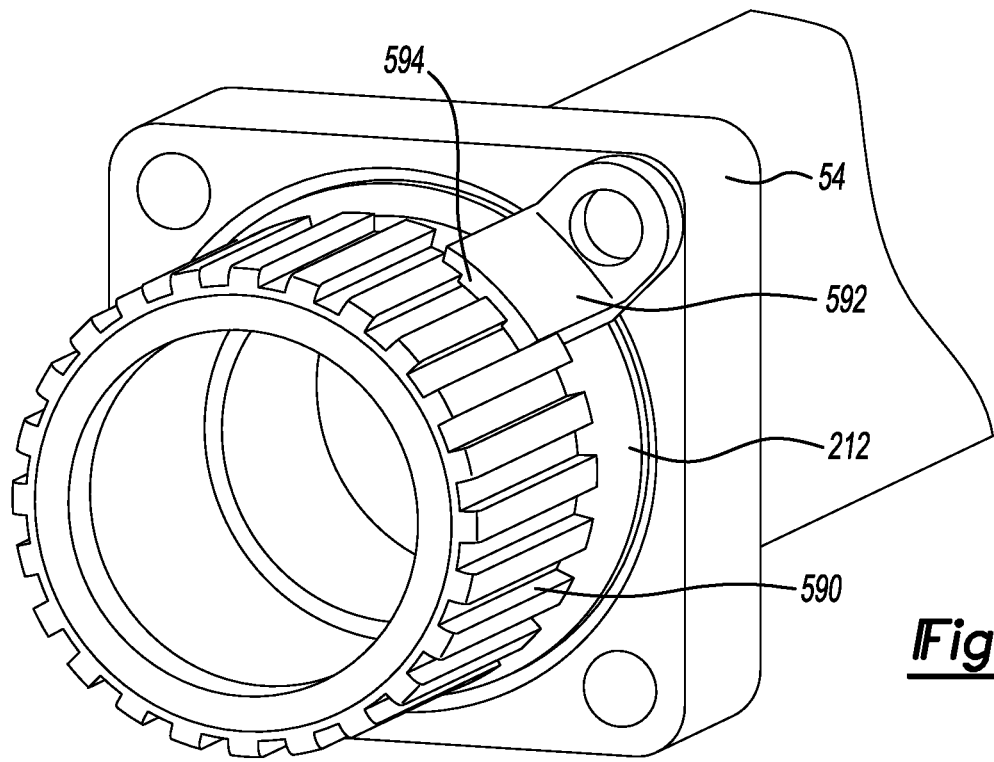
FIG. 14 is a perspective view of a portion of an axle housing constructed in accordance with the teachings of the present disclosure.

In FIG. 14, an alternately constructed bearing adjuster 226d is illustrated as being threadably mounted on a threaded portion of the hub 212 on the first carrier member 54. The bearing adjuster 226d comprises a plurality of locking features, such as teeth 590, on its outer circumferential surface. A locking bracket 592 can have a mating locking feature, such as mating teeth 594, that can matingly engage the locking features on the bearing adjuster 226. The locking bracket 592 can be fixedly coupled to the first carrier member 54. In the particular example provided, a bolt (not shown) is employed to removably secure the locking bracket 592 to the first carrier member 54.

Figure 15:
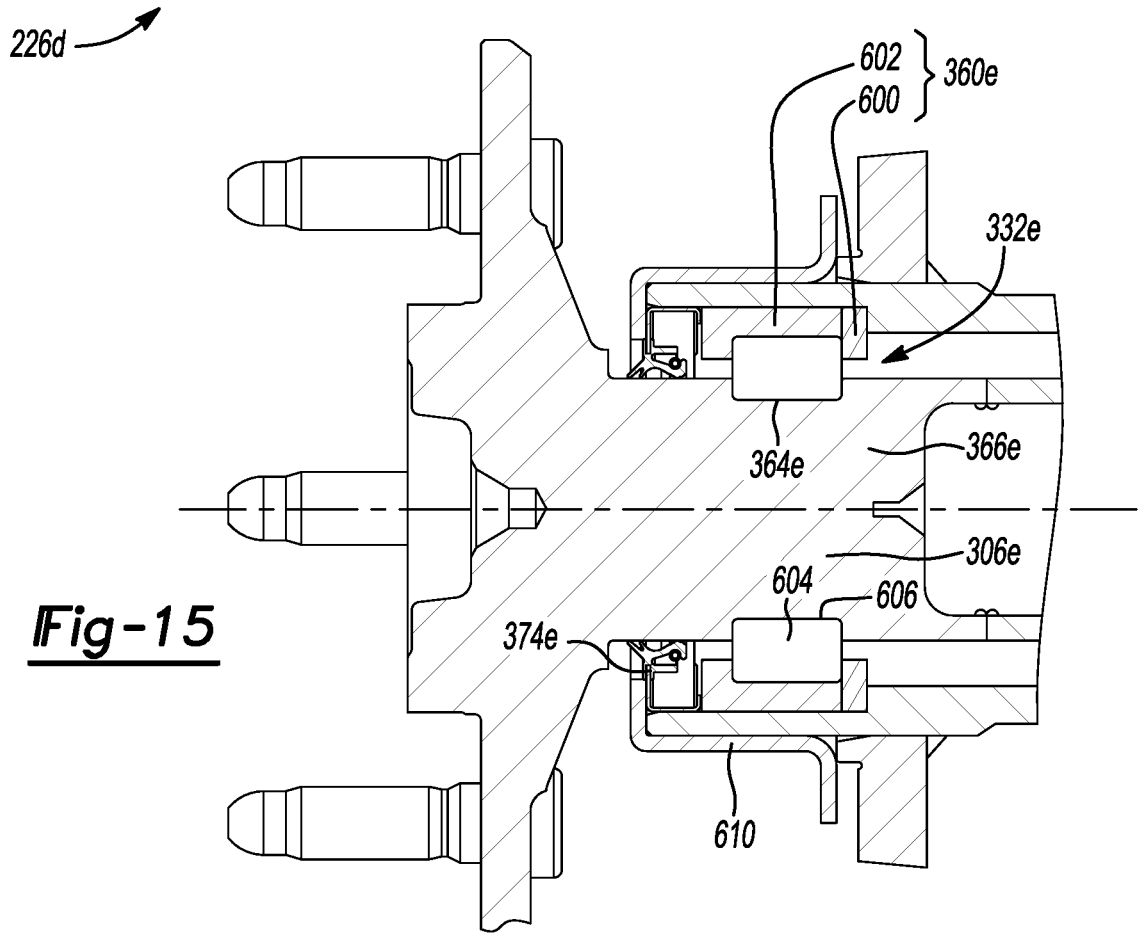
FIGS. 15 through 17 are views similar to that of FIG. 6 but illustrating three other axle assemblies constructed in accordance with the teachings of the present disclosure.
Figure 17:
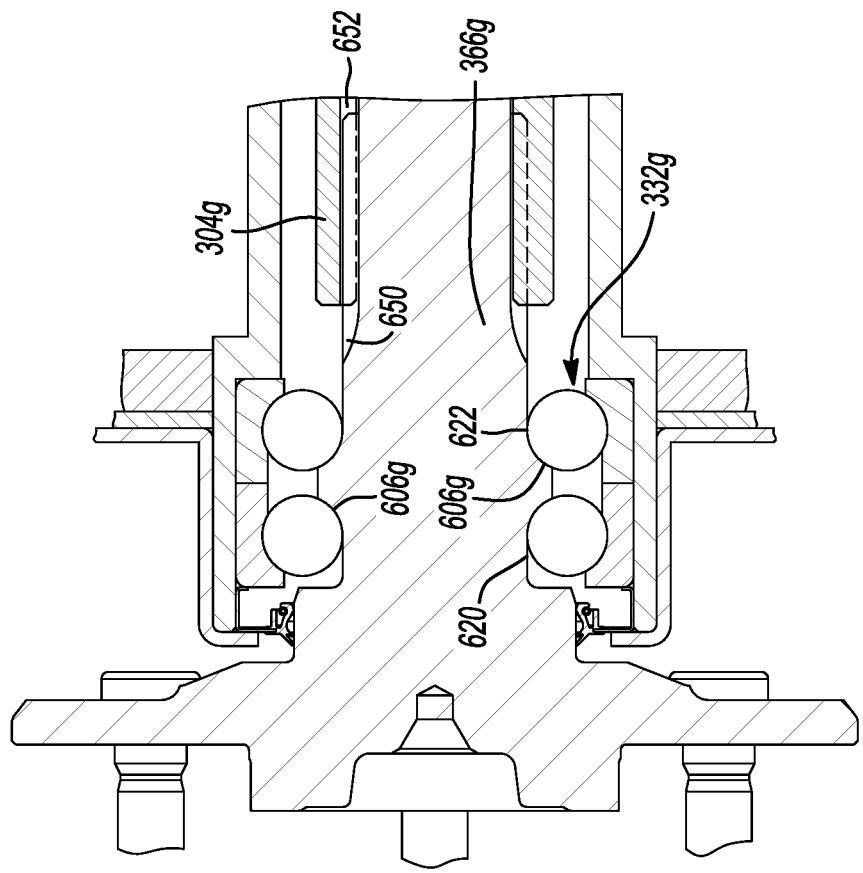
Figure 16:
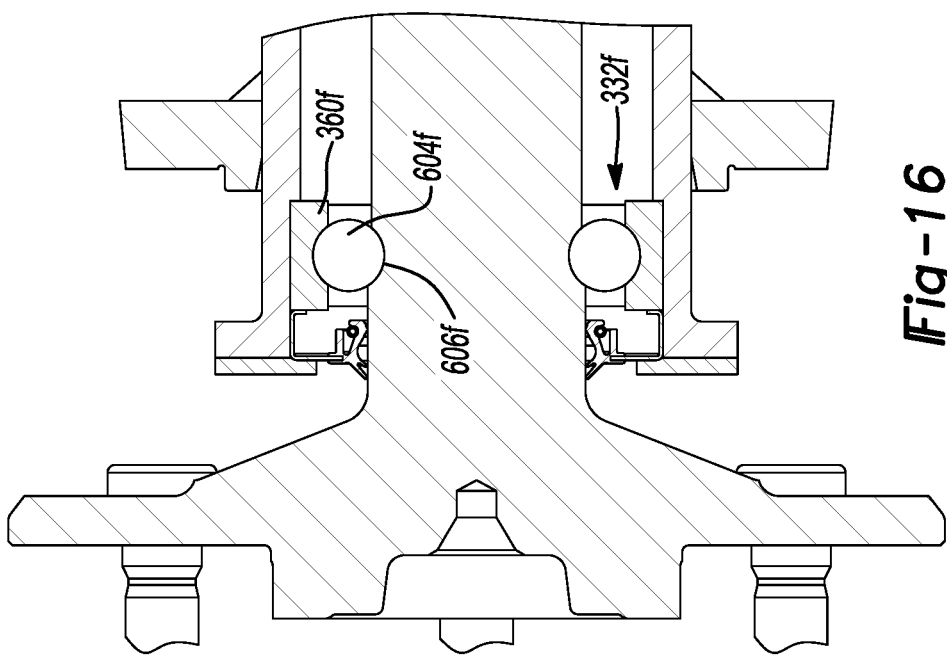

In the examples of FIGS. 15 through 17, different outboard axle bearing and wheel flange configurations are depicted. In FIG. 15, the outboard axle bearing 332e has an inner bearing race 364e that is integrally formed with the shaft portion 366e of the wheel flange 306e. The outer bearing race 360e can comprise first and second race members 600 and 602, which permit bearing elements, such as rollers 604, to be received in an undercut bearing surface 606 on the shaft portion 366e. A retainer 610 can be employed to retain the axle shaft seal 374e and the outer bearing race 360e in the first axle tube 56e or the second axle tube 66e.

The example of FIG. 16 is generally similar to that of FIG. 15, except that the outboard axle bearing 332f is a ball bearing, the bearing surface 606f is a groove for receiving the bearing balls 604f and the outer bearing race 360f is formed in a single piece.

The example of FIG. 17 is similar to that of FIG. 16 except that it employs a four-point contact ball bearing for the outboard axle bearing 332g in which the inner bearing races 620, 622 comprise bearing surfaces 606g (i.e., grooves) that are formed directly into the shaft portion 366g of the wheel flange 306g. Additionally, the wheel flange 306g employs a plurality of external spline teeth 650 that matingly engage internal spline teeth 652 on the shaft member 304g to non-rotatably but axially movably couple the wheel flange 306g to the shaft member 304g.

Figure 18:
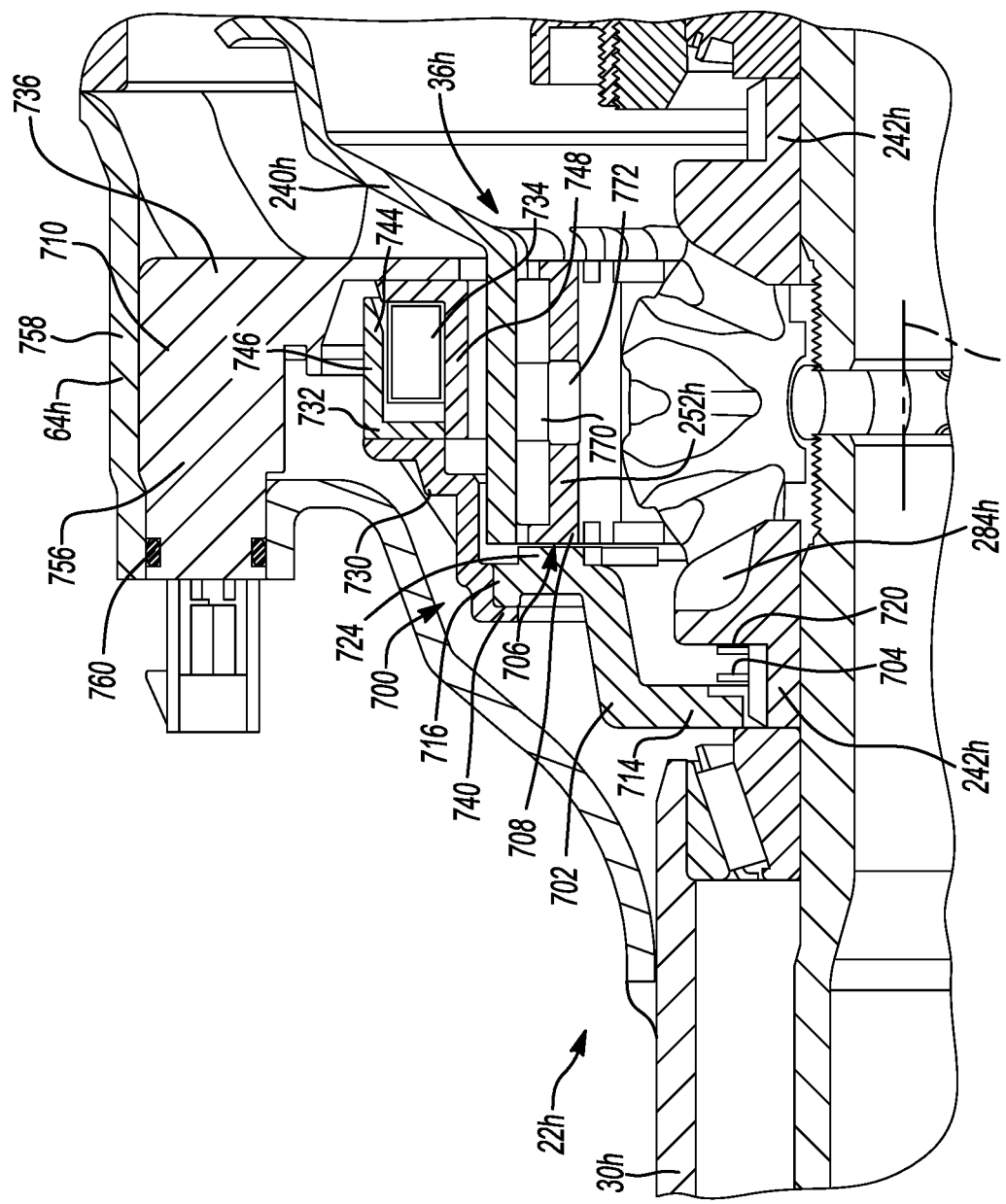
FIG. 18 is a section view of a portion of another axle assembly constructed in accordance with the teachings of the present disclosure.

In FIG. 18, a portion of another axle assembly constructed in accordance with the teachings of the present disclosure is generally indicated by reference numeral 22h. The axle assembly 22h can be generally similar to the axle assembly 22 (FIG. 2) except that the differential assembly 36h includes a locking mechanism 700 that is configured to inhibit speed differentiation between the output members 242h. The locking mechanism 700 can comprise a lock plate 702, a return spring 704, a first locking dog 706, a second locking dog 708, and a linear motor 710.

Figure 19:
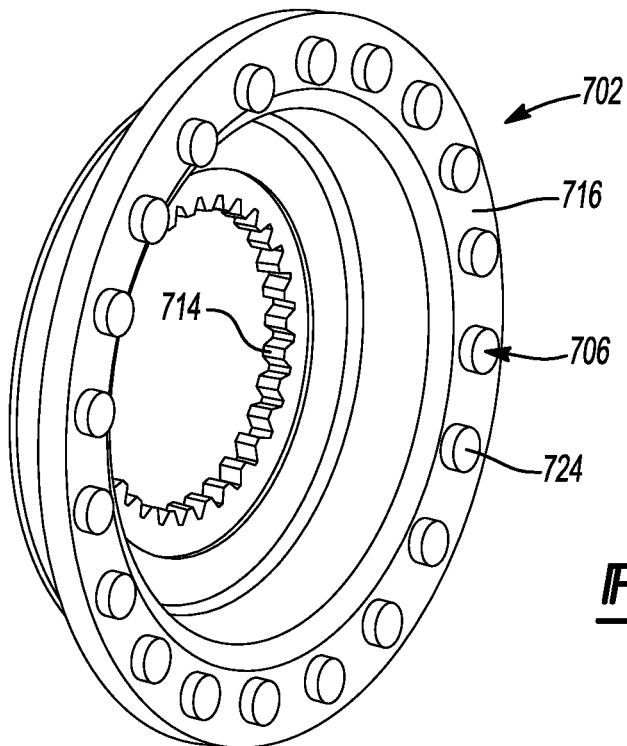
FIG. 19 is a perspective view of a portion of the axle assembly of FIG. 18, illustrating a lock plate and a first locking dog in more detail.

With additional reference to FIG. 19, the lock plate 702 can be formed of hardened stamped steel sheet or plate and can include a splined internal aperture 714 and an annular rim 716 that can be located concentrically about and radially outwardly of the splined internal aperture 714. The splined internal aperture 714 can define a plurality of spline teeth that can be non-rotatably but axially slidably engaged to mating splined teeth formed on one of the output members 242h/side gears 284h. The return spring 704 can be any device that can bias the lock plate 702 in a direction away from the differential pinions 282 and the pinion mount structures 252h. In the particular example provided, the return spring 704 comprises a wave spring that is received over the one of the output members 242h into a groove 720 formed on an axial end face of an associated one of the side gears 284h. The first locking dog 706 can be fixedly coupled to the annular rim 716 of the lock plate 702. In the example provided, the first locking dog 706 comprises projections 724 that are formed when the lock plate 702 is stamped, but it will be appreciated that the first locking dog 706 could have teeth, pins or any other type of locking device that can be formed as a discrete component and assembled to the lock plate 702.

Figure 20:
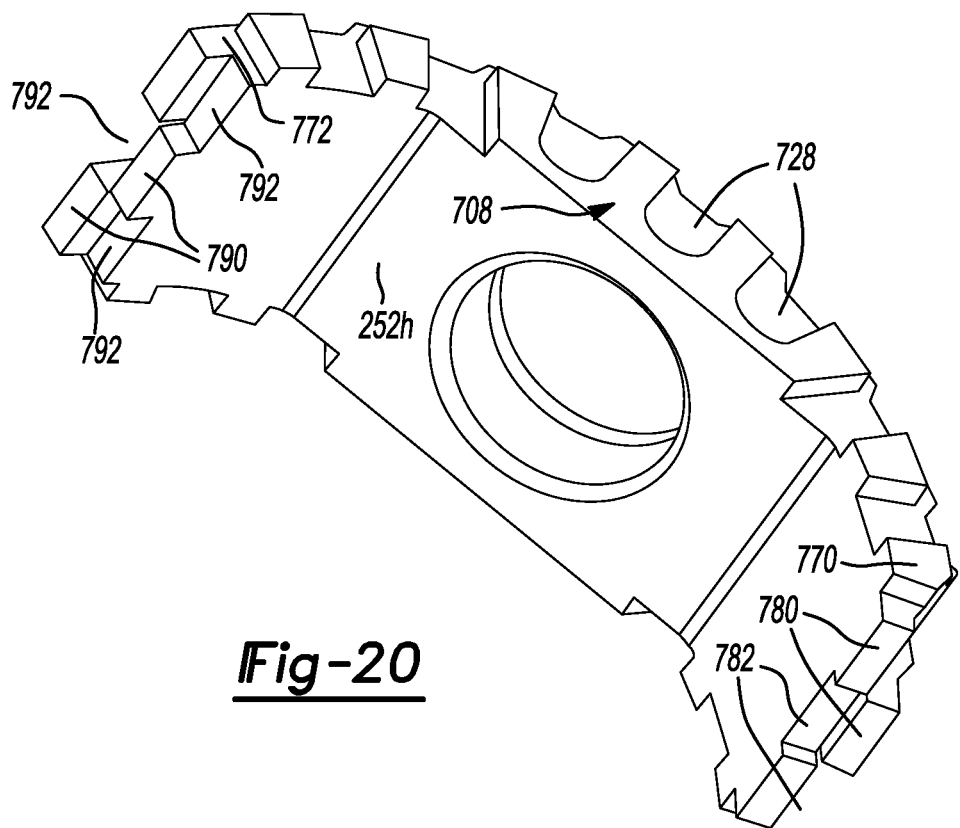
FIG. 20 is a perspective view of a portion of the axle assembly of FIG. 18, illustrating a pinion mount structure and a second locking dog in more detail.

With reference to FIGS. 18 and 20, the second locking dog 708 can be coupled to the differential case 240h and/or to the pinion mount structures 252h. In the particular example provided, the second locking dog 708 is integrally formed with the pinion mount structures 252h and comprises a plurality of recesses 728 formed into a side of the pinion mount structures 252h that are configured to matingly receive the projections 724 (FIG. 19) of the first locking dog 706. In the example provided, the pinion mount structures 252h are formed of powdered metal and as such, the recesses 728 are configured with draft to permit the dies (not shown) that are employed to form the pinion mount structures 252h to be separated from one another to eject the pinion mount structures 252h after they are formed.

Returning to FIG. 18, the linear motor 710 can be any type of device that is configured to translate the lock plate 702 along the second axis 42. In the particular example provided, the linear motor 710 is a solenoid and comprises a lock plate mount 730, an armature 732, a coil 734, and a coil mount 736. The lock plate mount 730 can be configured to couple the lock plate 702 to the armature 732 at least when the armature 732 is moved in a predetermined axial direction. In the particular example provided, the lock plate mount 730 is formed of a plastic material that is overmolded onto (i.e., cohesively bonded to) the armature 732. The lock plate mount 730 can define a radially inwardly extending lip member 740 that can be received about the annular rim 716 of the lock plate 702. The lip member 740 is not fixedly coupled to the annular rim 716 in the example provided, but is configured to contact the annular rim 716 when the armature 732 (and therefore the lock plate mount 730) is moved in an axial direction toward the coil 734. The armature 732 can be an annular structure that can be formed of a ferromagnetic material. The armature 732 can be generally L-shaped in cross-section with a sloped end 744 on its axially-extending leg 746. The coil 734 can be wound on a bobbin structure 748 that can be fixedly coupled to the coil mount 736.

Figure 21:
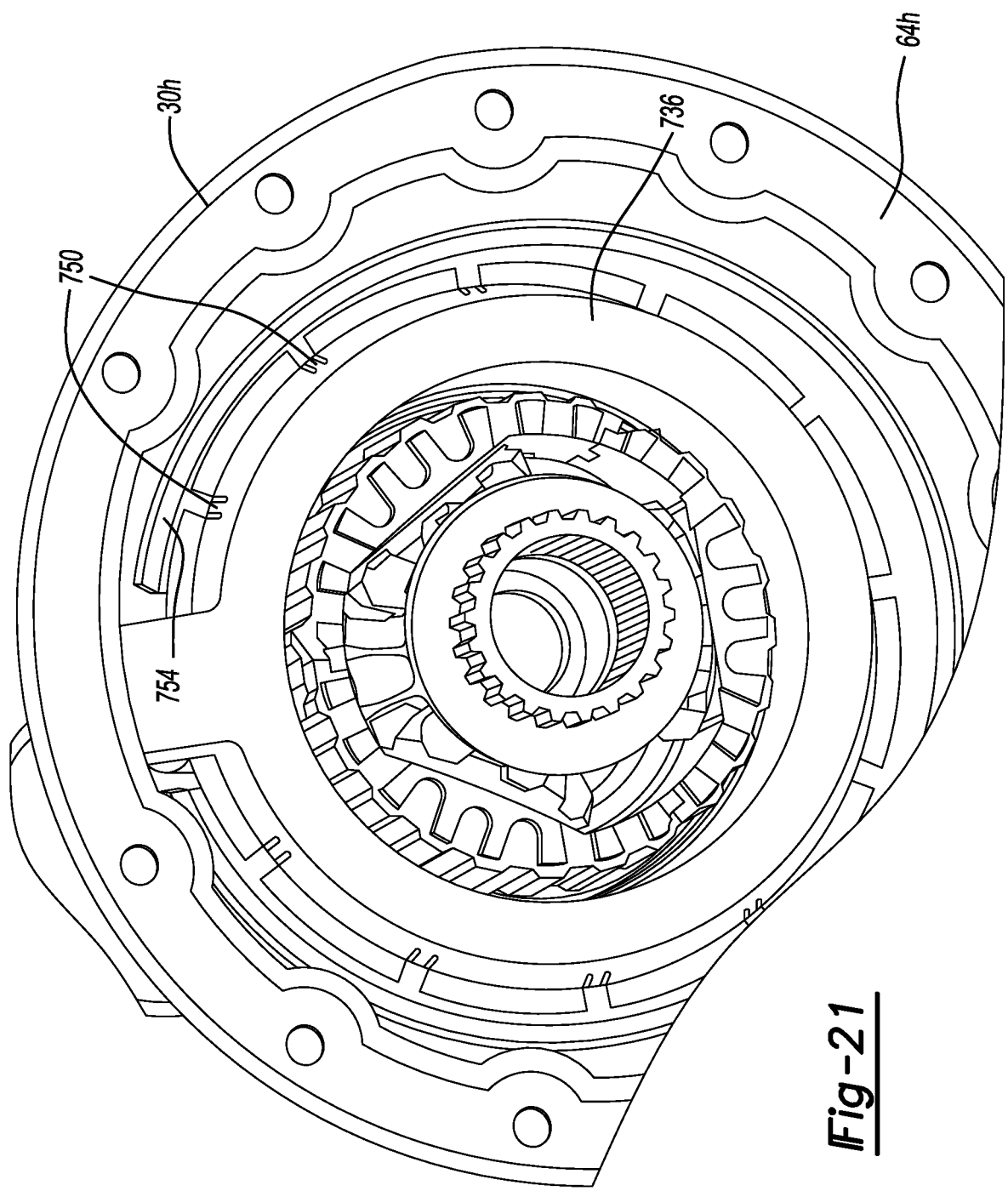
FIG. 21 is a perspective view of a portion of the axle assembly of FIG. 18, illustrating a portion of a locking mechanism in more detail.

With reference to FIG. 21, the coil mount 736 can comprise a plurality of cantilevered fingers 750. The cantilevered fingers 750 can have barbs (not specifically shown) at their distal ends that can be engaged in a snap-fit manner to a rim member 754 on the housing 30h. The rim member 754 can comprise a section or strip of generally L-shaped sheet steel that can be welded to the second carrier member 64h. Returning to FIG. 18, the coil mount 736 can include a coupling portion 756 that is configured to be coupled to a wire harness (not shown). The coupling portion 756 can be received into a boss 758 formed in the second carrier member 64h. A seal 760 can be mounted to the coupling portion 756 and can be sealingly engaged to the coupling portion 756 and the boss 758 to inhibit the ingress of fluids into and the egress of fluid from the housing 30h. While the particular linear motor described herein and illustrated in the appended drawings includes an electromagnet, it will be appreciated that other linear motors could be employed in the alternative, including pneumatic cylinders and hydraulic cylinders.

Figure 22:
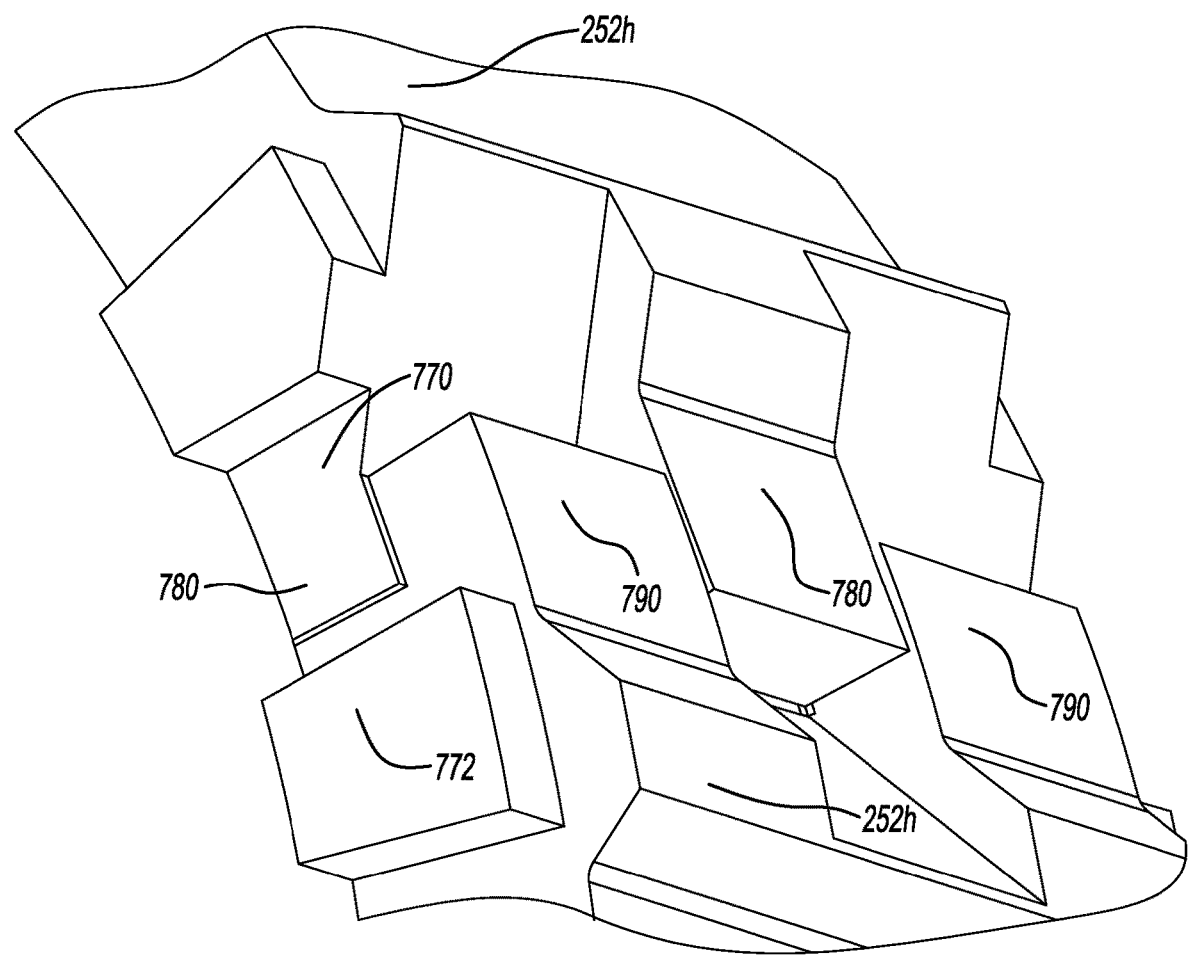
FIG. 22 is a perspective view of a portion of the axle assembly of FIG. 18, illustrating the interlocking of adjacent pinion mount structures.

With reference to FIGS. 20 and 22, the pinion mount structures 252h can be formed such that their ends 770 and 772 interlock with one another. Each of the ends 770 can comprise a plurality of first tabs 780 and a plurality of first recesses 782, while each of the ends 772 can comprise a plurality of second tabs 790 and a plurality of second recesses 792. Each of the second recesses 792 can be configured to receive a corresponding one of the first tabs 780, while each of the first recesses 782 can be configured to receive a corresponding one of the second tabs 790. The tabs and recesses on each of the ends 770 and 772 should be staggered such that the ends 770 and 772 interlock (and thereby support one another as is shown in FIG. 18) when adjacent pinion mount structures 252h are assembled to one another.

Figure 23:
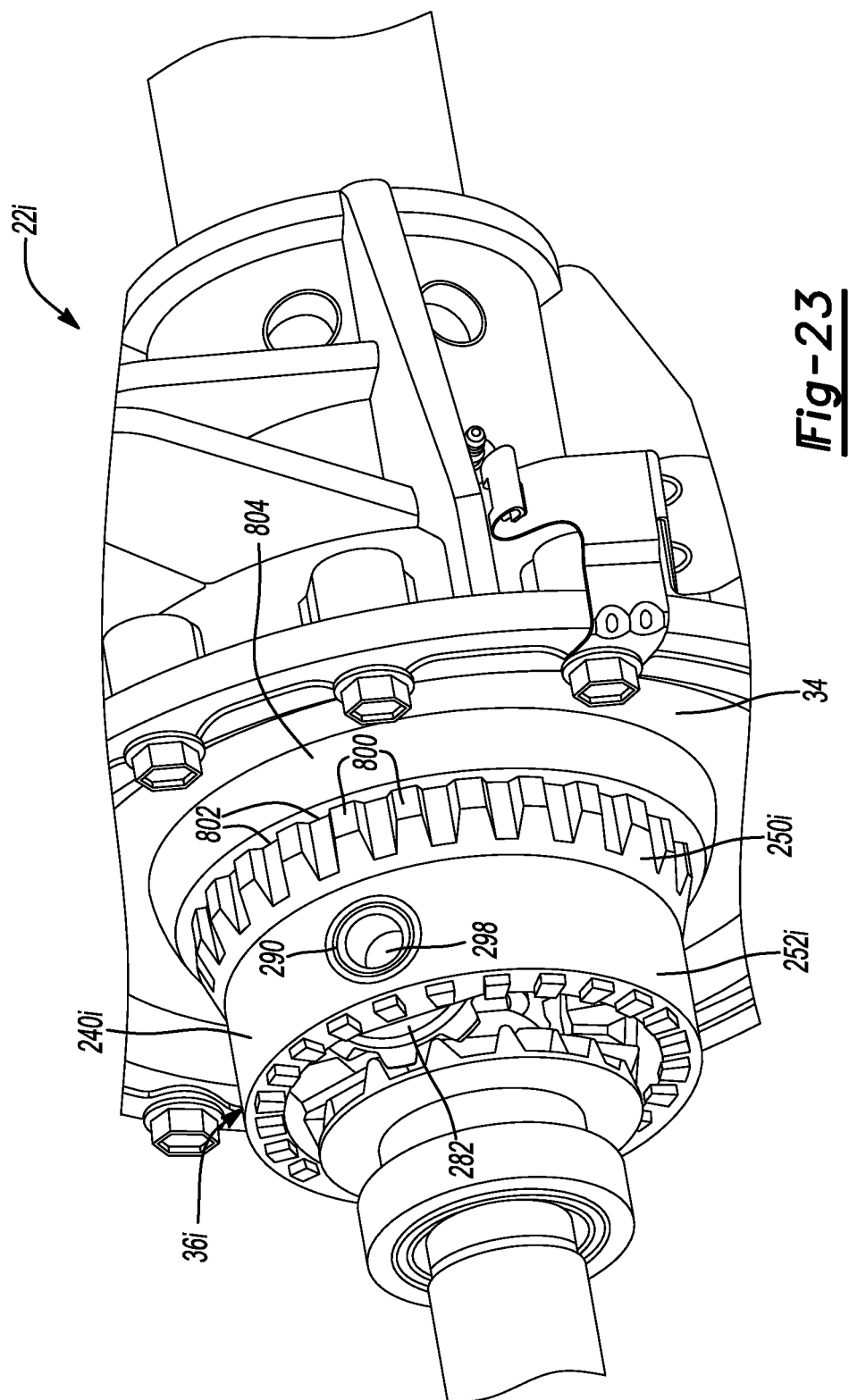
FIG. 23 is a perspective view of a portion of another axle assembly constructed in accordance with the teachings of the present disclosure.
Figure 24:
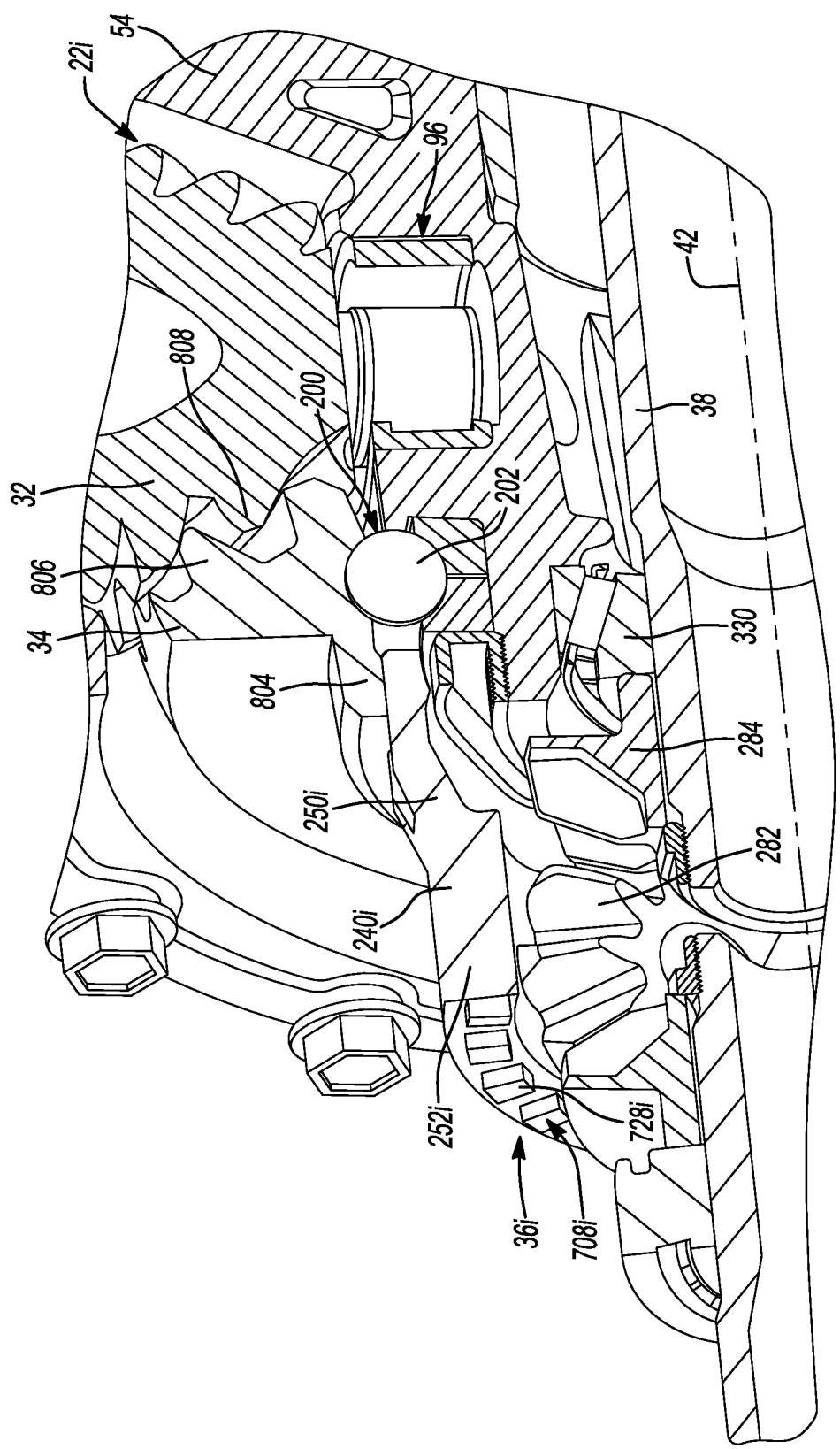
FIG. 24 is a stepped section view of the axle assembly of FIG. 23, having a first portion taken through a hypoid axis of an input pinion parallel to a rotational axis of a differential assembly, and a second portion taken through the rotational axis of the differential assembly parallel to the hypoid axis.

In FIGS. 23 and 24, a portion of another axle assembly constructed in accordance with the teachings of the present disclosure is generally indicated by reference numeral 22i. The axle assembly 22i can be generally similar to the axle assembly 22h (FIG. 18) except that the differential case 240i is integrally formed with a case member 250i and the pinion mounts 252i. In the particular example provided, the differential case 240i is a hollow tubular structure that is formed of a powdered metal material that is consolidated and heat-treated. The case member 250i of the differential case 240i can be fixedly coupled to the ring gear 34 by any desired method. In the particular example provided, a plurality of first teeth 800 on the case member 250i are meshingly and matingly engaged with a plurality of second teeth 802 formed on a hub portion 804 of the ring gear 34 and the case member 250i is additionally welded (e.g., laser welded) about its outer diameter to hub portion 804. While the differential case 240i can extend through the hub portion 804, it need not extend completely through the entire ring gear 34 (e.g., the case member 250i need not extend to a position radially inwardly of the ring gear teeth 806 that mesh with the pinion gear teeth 808 of the input pinion 32).

The pinion mounts 252i can be configured to support the pinion members 290 of the differential pinions 282 for rotation relative to the case member 250i about respective bevel pinion axes 298. Alternatively, the pinion mounts 252i could be configured to receive a conventional cross-pin (not shown) onto which conventional bevel pinions (not shown) could be rotatably received. The conventional cross-pin can be fixed to the differential case 240i in any desired manner, such as those described in commonly assigned U.S. Pat. No. 7,976,422 entitled "Differential With Cross Pin Retention System And Method For Assembly", the disclosure of which is incorporated by reference as if fully set forth in detail herein.

Construction in this manner can be advantageous, for example, to permit the bearing elements 202 of the ring gear bearing 200 to be spaced-axially apart but disposed axially in-line along the second axis 42 with the case member 250i, so that the differential assembly 36i can be constructed in a radially compact manner in which the head bearing 96 is also disposed axially in-line with the case member 250i along the second axis 42. In this arrangement, one of the axle shafts 38 that is coupled to one of the side gears 284 for rotation therewith extends through the ring gear 34, and the case member 250i is disposed radially outwardly of and about the inboard axle shaft bearing 330 that supports the one of the axle shafts 38 relative to the first carrier member 54. Also in this arrangement, the ring gear 34 is positioned axially along the second axis 42: a) between the differential case 240i and the input pinion 32; b) between the bevel pinions 282 and the input pinion 32; and c) between the side gears 284 and the input pinion 32.

While the axle assembly 22i has been described and illustrated as being an axle assembly with an open differential assembly, those of skill in the art will appreciate that the axle assembly 22i could optionally be equipped with a locking mechanism 700 (FIG. 18) that is configured to inhibit speed differentiation between the side gears 284. In this embodiment, the second locking dog 708i comprises a plurality of teeth 728i that are integrally formed with the differential case 240i and configured to matingly engage corresponding teeth or projections 724 (FIG. 19) on the lock plate 702 (FIG. 18) of the first locking dog 706 (FIG. 18). Like the above-described embodiment, the lock plate 702 (FIG. 18) can be translated (e.g., via linear motor 710 (FIG. 18)) to selectively couple the differential case 240i to the one of the output members 242h/side gears 284h (FIG. 18).

Figure 24A:
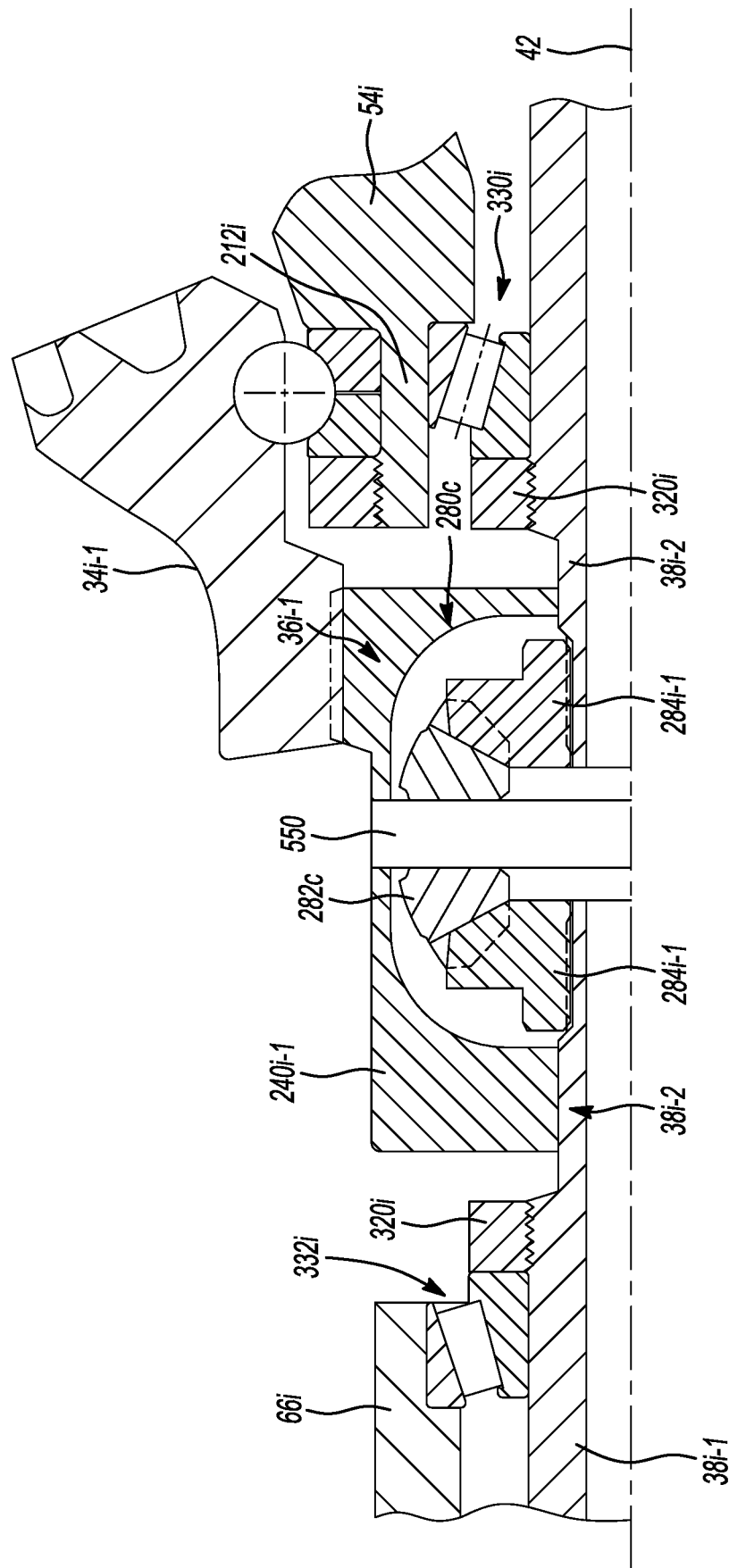
FIG. 24A is a longitudinal section view of a portion of another axle assembly constructed in accordance with the teachings of the present disclosure.

The example of FIG. 24A is generally similar to the example of FIGS. 23 and 24, except for the configuration of the differential assembly 36i-1 and the mounting of the inboard and outboard axle shaft bearings 330i and 332i. The differential assembly 36i-1 can include a unitarily formed differential case 240i-1 and a differential gearset 280c that has the cross-pin 550, differential pinions 282c rotatably mounted on the cross-pin 550, and a pair of side gears 284i-1. The differential case 240i-1 can be splined to the ring gear 34*i*-1 as described above and as such, can float axially along the second axis 42 relative to the ring gear 34*i*-1.

The inboard and outboard axle shaft bearings 330*i* and 332*i* can be received pockets formed in the hub 212*i* of the first carrier member 54*i* and in the axle tube 66*i*, respectively, and an axle shaft bearing preload nut 320*i* can be threadably engaged to the axle shafts 38*i*-1 at respective locations that are outboard of both the differential case 240*i*-1 and the side gears 284*i*-1. Additionally, the differential case 240*i*-1 can pilot on a locating portion 38*i*-2 of the outboard axle shaft 38*i*-1. In this example, the differential case 240*i*-1 can float in an axial direction along the second axis 42.

While the ring gear has been illustrated and described as including a single bearing, such as an annular contact bearing (e.g., a four-point contact ball bearing), it will be appreciated that the ring gear could be supported by a plurality of bearings. In FIG. 25 for example, the ring gear 34*j* is supported by an inner ring gear bearing 200*j*-1 and an outer ring gear bearing 200*j*-2.

The inner ring gear bearing 200*j*-1 can comprise a plurality of bearing elements 202*j*-1, an outer bearing race 204*j*-1, and an inner bearing race 206*j*-1. The bearing elements 202*j*-1 can be any type of element that can roll relative to the outer and inner bearing races 204*j*-1 and 206*j*-1. In the particular example provided, the bearing elements 202*j*-1 comprise bearing balls. The outer bearing race 204*j*-1 can comprise a bearing groove 210*j*-1 that can be formed into a desired portion of the ring gear 34*j*, such as the in the toe or inside diametrical surface of the ring gear 34*j*. The bearing elements 202*j*-1 can be received into the bearing groove 210*j*-1 such that the outer bearing race 204*j*-1 is unitarily and integrally formed with the ring gear 34*j*. The inner bearing race 206*j*-1 can be received on a hub 212*j* formed on the first carrier member 54*j* and abutted against a shoulder 1000. The inner ring gear bearing 200*j*-1 can be an angular contact bearing.

The outer ring gear bearing 200*j*-2 can comprise a plurality of bearing elements 202*j*-2, an outer bearing race 204*j*-2, and an inner bearing race 206*j*-2. The bearing elements 202*j*-2 can be any type of element that can roll relative to the outer and inner bearing races 204*j*-2 and 206*j*-2. In the particular example provided, the bearing elements 202*j*-2 comprise bearing balls. The inner bearing race 206*j*-2 can comprise a bearing groove 210*j*-2 that can be formed into a desired portion of the ring gear 34*j*, such as the in the outside diametrical surface of the ring gear 34*j*. The bearing elements 202*j*-2 can be received into the bearing groove 210*j*-2 such that the inner bearing race 206*j*-2 is unitarily and integrally formed with the ring gear 34*j*. The outer bearing race 204*j*-2 can be received in a counterbore 1002 formed in the second carrier member 64*j* and abutted against a shoulder 1004 on the second carrier member 64*j*. A threaded adjuster 1006 can be threadably engaged to the second carrier member 64*j* and can be employed to generate a preload that is applied to the inner and outer ring gear bearings 200*j*-1 and 200*j*-2.

Alternatively, a plurality of ring gear bearings could be employed to support the ring gear, either from its inner side or its outer side. In the example of FIG. 26, first and second ring gear bearings 200*k*-1 and 200*k*-2 are employed to support the ring gear 200*k* from its inner side.

The first ring gear bearing 200*k*-1 can comprise a plurality of bearing elements 202*k*-1, an outer bearing race 204*k*-1, and an inner bearing race 206*k*-1. The bearing elements 202*k*-1 can be any type of element that can roll relative to the outer and inner bearing races 204*k*-1 and 206*k*-1. In the particular example provided, the bearing elements 202*k*-1 comprise bearing balls. The outer bearing race 204*k*-1 can comprise a bearing groove 210*k*-1 that can be formed into a desired portion of the ring gear 34*k*, such as the in the toe or inside diametrical surface of the ring gear 34*k*. The bearing elements 202*k*-1 can be received into the bearing groove 210*k*-1 such that the outer bearing race 204*k*-1 is unitarily and integrally formed with the ring gear 34*k*. The inner bearing race 206*k*-1 can be received on a hub 212*k* formed on the first carrier member 54*k* and abutted against a shoulder 1000*k*. The first ring gear bearing 200*k*-1 can be an angular contact bearing. A spacer 1010 can be disposed between the first and second ring gear bearings 200*k*-1 and 200*k*-2.

The second ring gear bearing 200*k*-2 can comprise a plurality of bearing elements 202*k*-2, an outer bearing race 204*k*-2, and an inner bearing race 206*k*-2. The bearing elements 202*k*-2 can be any type of element that can roll relative to the outer and inner bearing races 204*k*-2 and 206*k*-2. In the particular example provided, the bearing elements 202*k*-2 comprise bearing balls. The outer bearing race 204*k*-2 can comprise a bearing groove 210*k*-2 that can be formed into a desired portion of the ring gear 34*k*, such as the in the toe or inside diametrical surface of the ring gear 34*k*. The bearing elements 202*k*-2 can be received into the bearing groove 210*k*-2 such that the outer bearing race 204*k*-2 is unitarily and integrally formed with the ring gear 34*k*. The inner bearing race 206*k*-2 can be received on the hub 212*k* that is formed on the first carrier member 54*k*. The second ring gear bearing 200*k*-2 can be an angular contact bearing. A threaded adjuster 1006*k* can be threadably engaged to the hub 212*k* of the second carrier member 64*k* and can be employed to generate a preload that is applied to the first and second ring gear bearings 200*k*-1 and 200*k*-2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
   a carrier housing;
   an input pinion received in the carrier housing and rotatable about a first axis, the input pinion having a plurality of pinion teeth;
   a ring gear received in the carrier housing and rotatable about a second axis that is not parallel to the first axis, the ring gear having a plurality of ring gear teeth;
   a case received in the carrier housing and coupled to the ring gear for rotation about the second axis;
   a first bearing assembly supporting the input pinion for rotation about the first axis relative to the carrier housing, the first bearing assembly having a first outer bearing race that is mounted to the carrier housing at a location along the first axis between the case and a radially inner side of the ring gear teeth;
   a second bearing assembly supporting the input pinion for rotation about the first axis relative to the carrier housing, wherein the pinion teeth are disposed along the first axis between the first bearing assembly and the second bearing assembly; and a third bearing assembly supporting the ring gear for rotation about the second axis relative to the carrier housing, the third bearing assembly being disposed along the second axis on a side of the ring gear teeth that is opposite the first axis;

wherein the third bearing assembly comprises a plurality of bearing elements that are disposed about the second axis, wherein the bearing elements are disposed radially outward of a circumferential surface formed on the ring gear, and wherein the third bearing assembly is an angular contact bearing.

2. The axle assembly of claim 1, wherein the circumferential surface on the ring pear is disposed radially outwardly from radially inward ends of gear teeth that form the ring gear.

3. The axle assembly of claim 1, wherein the angular contact bearing is a four-point angular contact bearing.

4. The axle assembly of claim 1, wherein the first bearing assembly is a roller bearing assembly having a plurality of rollers that are disposed between the first outer bearing race and a first inner bearing race.

5. The axle assembly of claim 4, wherein the rollers are shaped as right cylinders.

6. The axle assembly of claim 1, wherein the third bearing assembly includes a bearing race that is integrally formed with the ring gear.

7. The axle assembly of claim 6, wherein the bearing race is an inner bearing race.

8. The axle assembly of claim 1, wherein the second bearing assembly includes an inner bearing race that is integrally formed with the input pinion.

9. The axle assembly of claim 1, wherein the second bearing assembly is an angular contact bearing.

10. The axle assembly of claim 9, wherein the angular contact bearing is a four-point angular contact bearing.

11. The axle assembly of claim 1, further comprising a differential gearset that is received in the case.

12. The axle assembly of claim 1, wherein the second bearing assembly is disposed along the first axis on a side of the pinion teeth that is opposite the first bearing.

13. An axle assembly comprising:
a carrier housing;
an input pinion received in the carrier housing and rotatable about a first axis, the input pinion having a plurality of pinion teeth;
a ring gear received in the carrier housing and rotatable about a second axis that is not parallel to the first axis, the ring gear having a plurality of ring gear teeth;
a case received in the carrier housing and coupled to the ring gear for rotation about the second axis;
a first bearing assembly supporting the input pinion for rotation about the first axis relative to the carrier housing, the first bearing assembly having a first outer bearing race that is mounted to the carrier housing at a location along the first axis between the case and a radially inner side of the ring gear teeth;
a second bearing assembly supporting the input pinion for rotation about the first axis relative to the carrier housing, wherein the pinion teeth are disposed along the first axis between the first bearing assembly and the second bearing assembly; and
a third bearing assembly supporting the ring gear for rotation about the second axis relative to the carrier housing, the third bearing assembly being disposed along the second axis on a side of the ring gear teeth that is opposite the first axis;

wherein the carrier housing defines a first annular shoulder that is disposed concentrically about the first axis and a second annular shoulder that is disposed concentrically about the second axis, wherein the second bearing assembly has an outer bearing race whose movement along the first axis toward the ring gear teeth is limited by the first annular shoulder, and wherein the third bearing assembly has an outer bearing race whose movement along the second axis toward the input pinion is limited by the second annular shoulder.

14. An axle assembly comprising:
a carrier housing defining a first bore, which is disposed about a first axis, and second bore that is disposed about a second axis that is not parallel to the first axis, the second bore intersecting the first bore, the carrier housing having a first annular shoulder, which is disposed about the first axis, and a second annular shoulder that is disposed about the second axis;
an input pinion received in the first bore in the carrier housing and rotatable about the first axis, the input pinion having a plurality of pinion teeth;
a ring gear received in the second bore in the carrier housing and rotatable about the second axis, the ring gear having a plurality of ring gear teeth;
a case received in the carrier housing and coupled to the ring gear for rotation about the second axis;
a first bearing assembly supporting the input pinion for rotation about the first axis relative to the carrier housing, the first bearing assembly having a first outer bearing race that is mounted to the carrier housing at a location along the first axis between a radially inboard side of the ring gear teeth and a point at which the first axis overlies or intersects the second axis;
a second bearing assembly supporting the input pinion for rotation about the first axis relative to the carrier housing, the second bearing having a second outer bearing race and wherein the first annular shoulder limits movement of the second outer bearing race along the first axis in a direction toward the ring gear;
a third bearing assembly supporting the ring gear for rotation about the second axis relative to the carrier housing, the third bearing assembly being disposed along the second axis on a side of the ring gear teeth that is opposite the first axis, the third bearing assembly having a third outer bearing race and wherein the second annular shoulder limits movement of the third outer bearing race along the second axis in a direction toward the input pinion;
a first cover received about the input pinion and fixedly coupled to the carrier housing, the first cover securing the second outer bearing race to the carrier housing; and
a second cover fixedly coupled to the carrier housing and securing the third outer bearing race to the carrier housing.

15. The axle assembly of claim 14, wherein the third bearing assembly comprises a plurality of bearing elements that are disposed about the second axis, and wherein the bearing elements are disposed radially outward of a circumferential surface formed on the ring gear.

16. The axle assembly of claim 15, wherein the third bearing assembly is an angular contact bearing.

17. The axle assembly of claim 16, wherein the angular contact bearing is a four-point angular contact bearing.

18. The axle assembly of claim 15, wherein the bearing elements comprise spherical bearing balls.

19. The axle assembly of claim 14, wherein the first bearing assembly is a roller bearing assembly having a plurality of rollers that are disposed between the first outer bearing race and a first inner bearing race.

20. The axle assembly of claim 19, wherein the rollers are cylindrically shaped.

21. The axle assembly of claim 14, wherein the third bearing assembly includes an inner bearing race that is integrally formed with the ring gear.

22. The axle assembly of claim 14, wherein the second bearing assembly includes an inner bearing race that is integrally formed with the input pinion.

23. The axle assembly of claim 14, wherein the second bearing assembly is an angular contact bearing.

24. The axle assembly of claim 23, wherein the angular contact bearing is a four-point angular contact bearing.

25. The axle assembly of claim 14, further comprising a differential gearset that is received in the case.

26. The axle assembly of claim 14, wherein the second bearing assembly is disposed along the first axis on a side of the pinion teeth that is opposite the first bearing.

\* \* \* \* \*

UNITED STATES PATENT AND TRADEMARK OFFICE
CERTIFICATE OF CORRECTION

Page 1 of 1

PATENT NO. : 10,975,945 B2
APPLICATION NO. : 15/213602
DATED : April 13, 2021
INVENTOR(S) : James P. Downs et al.

It is certified that error appears in the above-identified patent and that said Letters Patent is hereby corrected as shown below:

In the Claims

Column 23, Line 13 Claim 2, delete "pear," and insert --gear-- therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*